(12) United States Patent
Chen et al.

(10) Patent No.: US 11,579,406 B2
(45) Date of Patent: Feb. 14, 2023

(54) OPTICAL IMAGING LENS ASSEMBLY

(71) Applicant: Zhejiang Sunny Optical Co., Ltd, Ningbo (CN)

(72) Inventors: Nian Chen, Ningbo (CN); Kaiyuan Zhang, Ningbo (CN); Fujian Dai, Ningbo (CN); Liefeng Zhao, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 319 days.

(21) Appl. No.: 17/032,862

(22) Filed: Sep. 25, 2020

(65) Prior Publication Data

US 2021/0132336 A1 May 6, 2021

(30) Foreign Application Priority Data

Nov. 6, 2019 (CN) .......................... 201911076595.8

(51) Int. Cl.
| | | |
|---|---|---|
| *G02B 13/18* | (2006.01) | |
| *G02B 9/64* | (2006.01) | |
| G02B 3/04 | (2006.01) | |
| G02B 3/00 | (2006.01) | |
| G02B 27/00 | (2006.01) | |
| G02B 13/00 | (2006.01) | |

(52) U.S. Cl.
CPC .............. *G02B 9/64* (2013.01); *G02B 13/18* (2013.01); *G02B 3/04* (2013.01); *G02B 13/002* (2013.01); *G02B 13/0045* (2013.01); *G02B 27/0025* (2013.01); *G02B 27/0081* (2013.01); *G02B 2003/0093* (2013.01)

(58) Field of Classification Search
CPC ...... G02B 13/18; G02B 9/64; G02B 27/0081; G02B 5/005; G02B 13/0045; G02B 13/002; G02B 27/0025; G02B 3/04; G02B 2003/0093
USPC .......................... 359/708, 713, 740, 754, 755
See application file for complete search history.

(56) References Cited

U.S. PATENT DOCUMENTS

| | | | | |
|---|---|---|---|---|
| 10,429,621 | B2* | 10/2019 | Jhang | ................. G02B 13/0045 |
| 10,509,206 | B2* | 12/2019 | Jhang | ..................... G02B 1/041 |
| 10,585,265 | B2* | 3/2020 | Jhang | ....................... G02B 9/64 |
| 10,901,187 | B2* | 1/2021 | Jhang | ................. G02B 13/0045 |
| 11,009,684 | B2* | 5/2021 | Jhang | ....................... G02B 9/64 |
| 2019/0204556 | A1* | 7/2019 | Jhang | ....................... G02B 3/04 |
| 2019/0204558 | A1* | 7/2019 | Jhang | ................. G02B 13/0045 |
| 2019/0204559 | A1* | 7/2019 | Jhang | ..................... G02B 13/06 |

(Continued)

*Primary Examiner* — Evelyn A Lester
(74) *Attorney, Agent, or Firm* — Barnes & Thornburg LLP

(57) ABSTRACT

The present disclosure discloses an optical imaging lens assembly including, sequentially from an object side to an image side along an optical axis, a first lens having refractive power; a second lens having refractive power; a third lens having negative refractive power; a fourth lens having refractive power and a convex object-side surface; a fifth lens having refractive power and a concave object-side surface; a sixth lens having refractive power; a seventh lens having refractive power; and an eighth lens having refractive power. A total effective focal length f of the optical imaging lens assembly and half of a maximal field-of-view Semi-FOV of the optical imaging lens assembly satisfy: f*tan (Semi-FOV)>5.5 mm. A total effective focal length f of the optical imaging lens assembly and an effective focal length f1 of the first lens satisfy: 0.5<f/f1<1.5.

20 Claims, 11 Drawing Sheets

(56) References Cited

U.S. PATENT DOCUMENTS

| | | | |
|---|---|---|---|
| 2019/0361203 A1* | 11/2019 | Jhang | G02B 13/0045 |
| 2020/0124829 A1* | 4/2020 | Jhang | G02B 9/64 |
| 2020/0249437 A1* | 8/2020 | Hirano | G02B 13/18 |
| 2020/0285028 A1* | 9/2020 | Hirano | G02B 9/64 |
| 2021/0165190 A1* | 6/2021 | Jhang | G02B 13/0045 |
| 2021/0294078 A1* | 9/2021 | Jhang | G02B 13/0045 |
| 2021/0356702 A1* | 11/2021 | Hirano | G02B 13/002 |

* cited by examiner

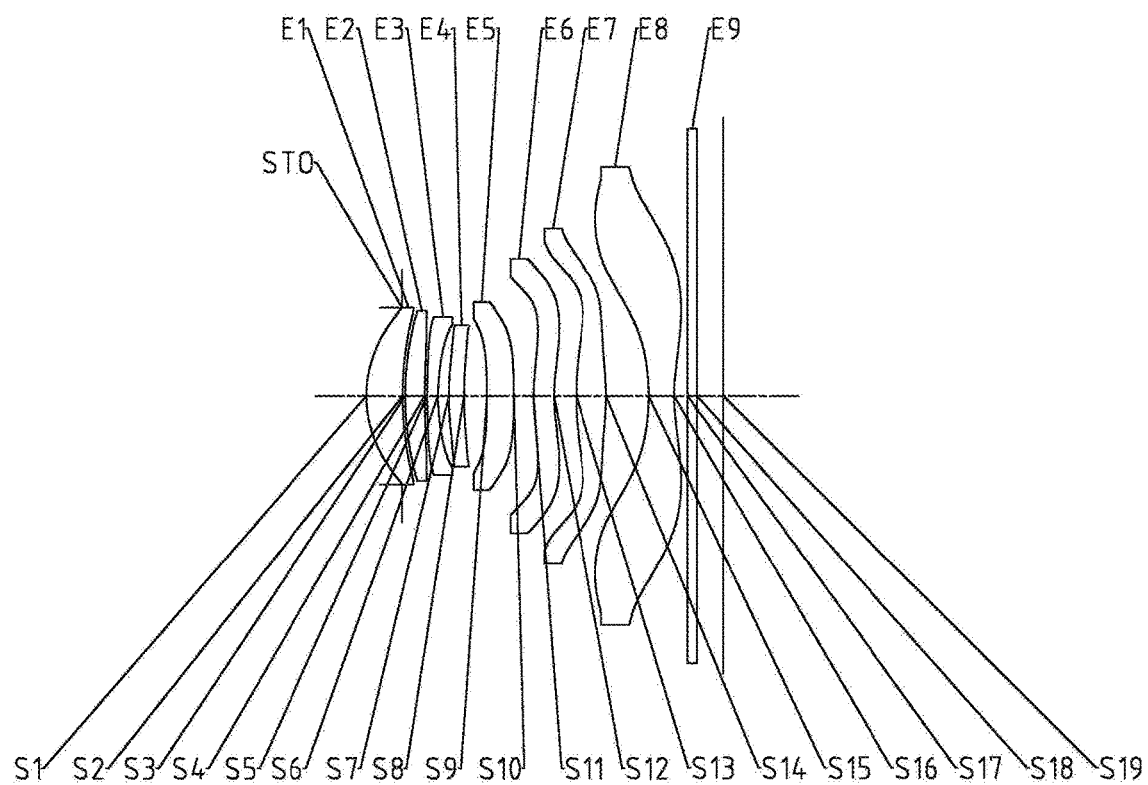
Fig. 1
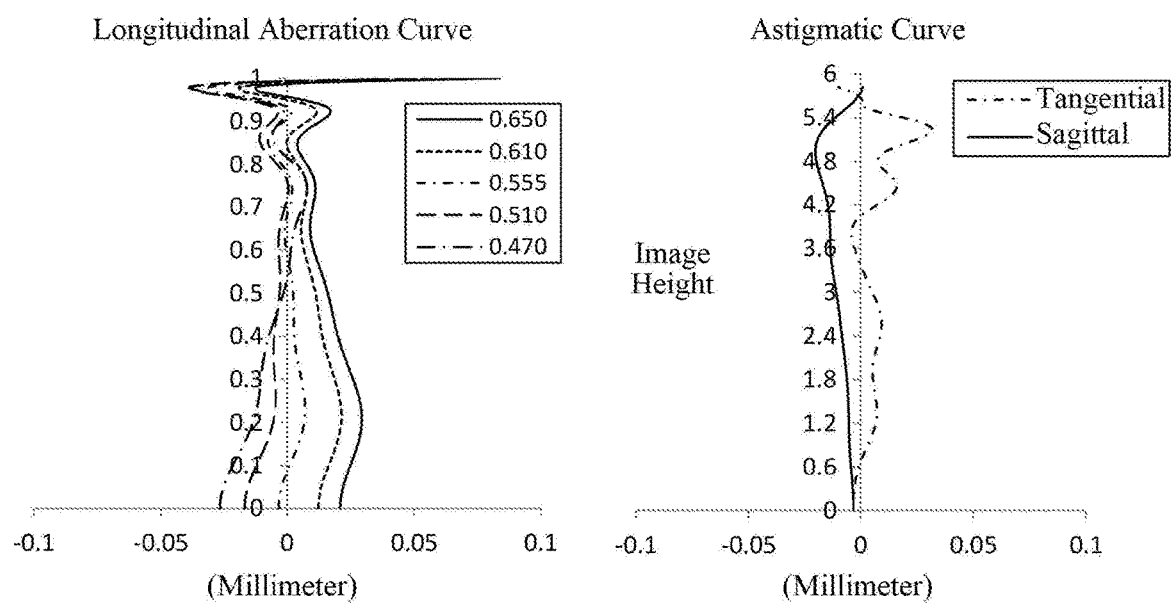
Fig. 2A
Fig. 2B

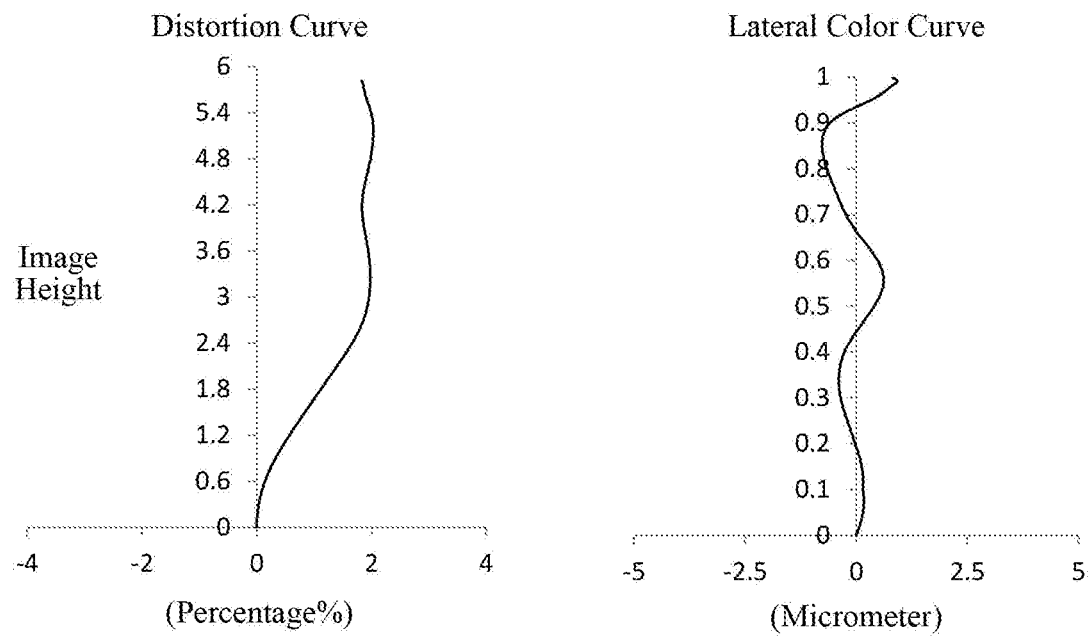
Fig. 2C
Fig. 2D
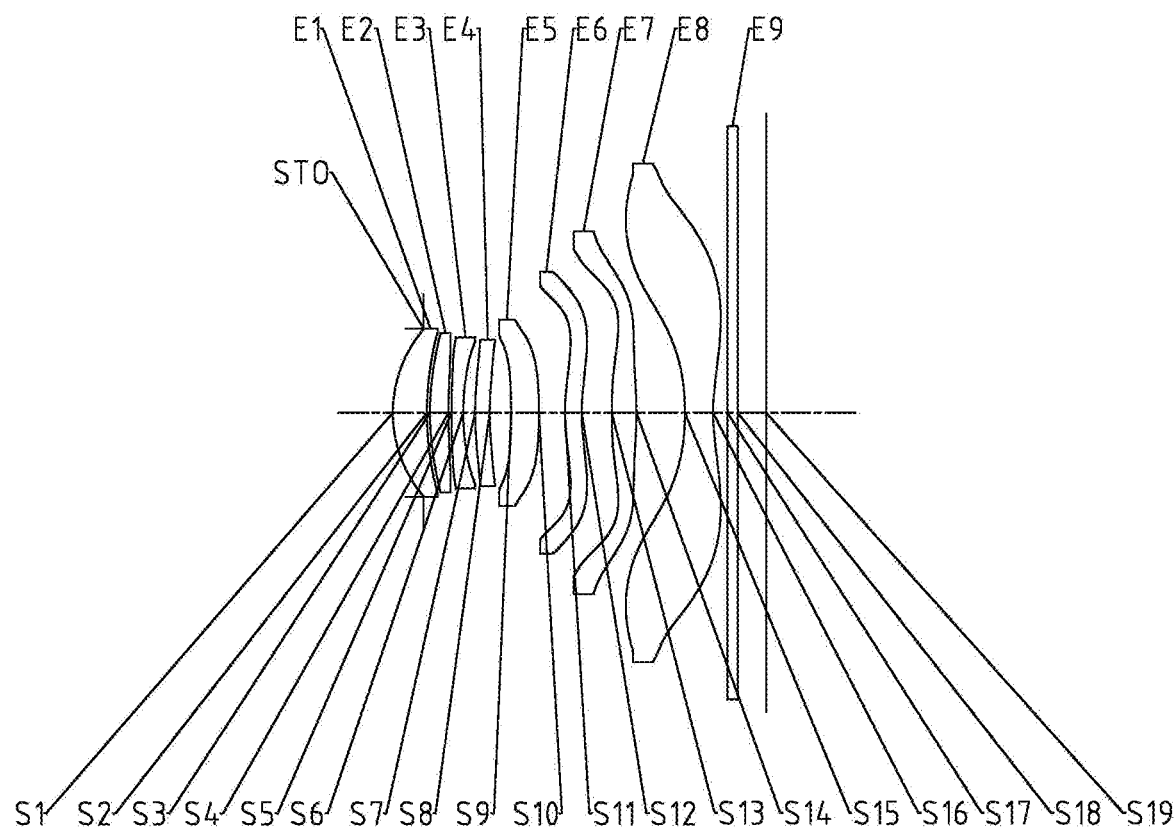
Fig. 3

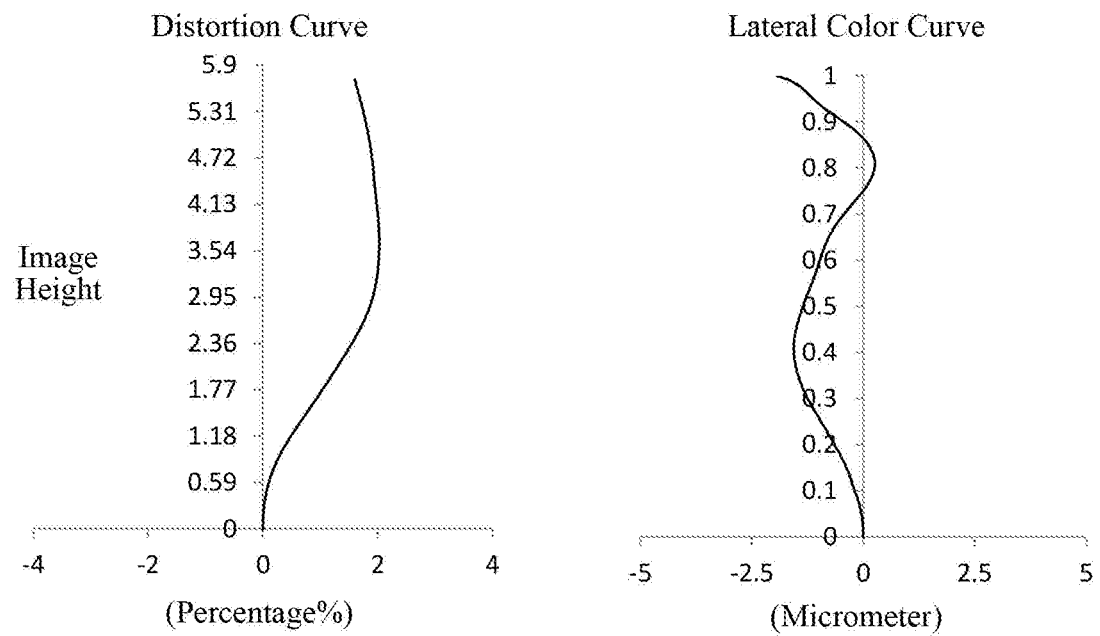
Fig. 6C
Fig. 6D
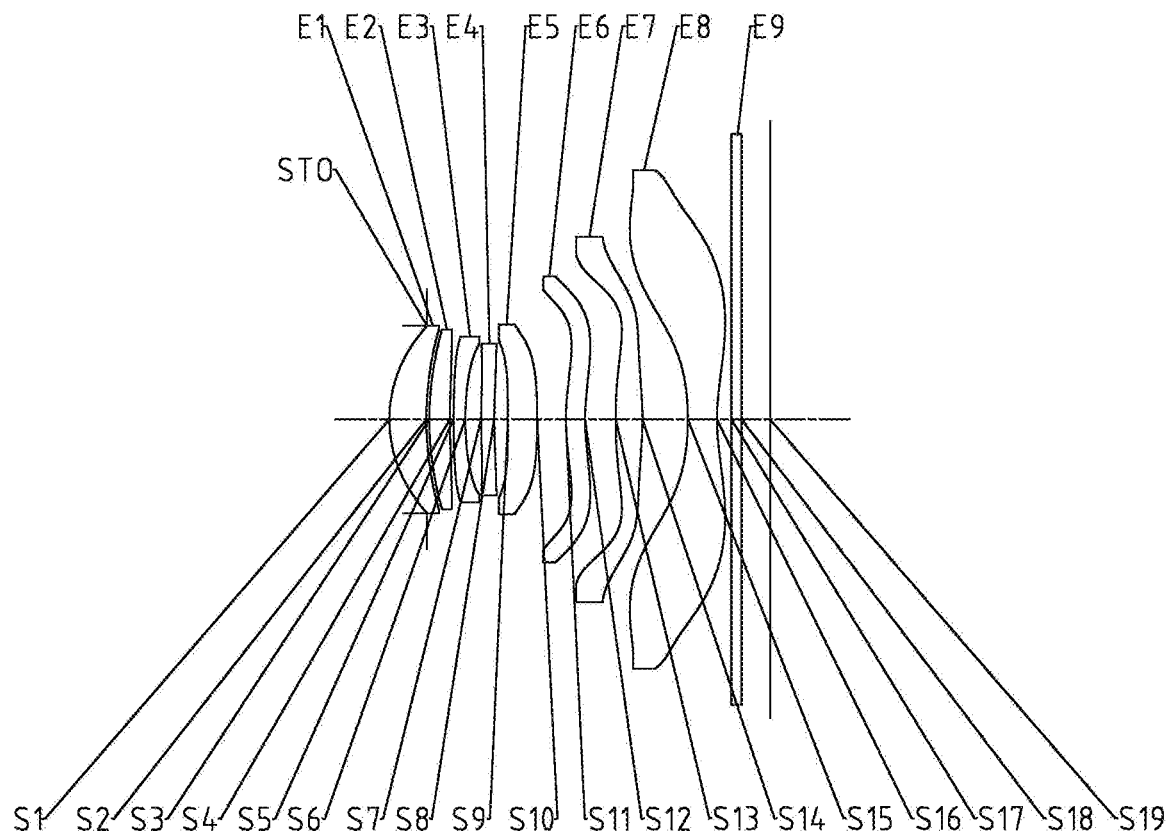
Fig. 7

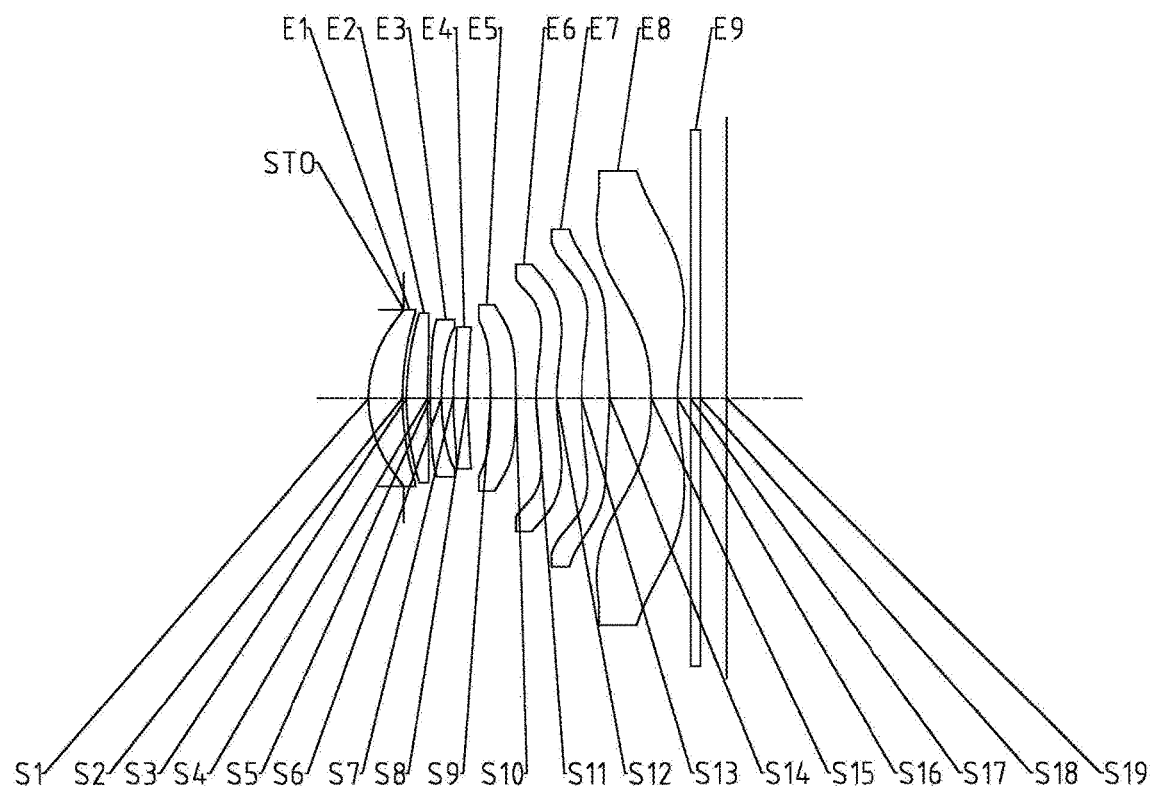
Fig. 9
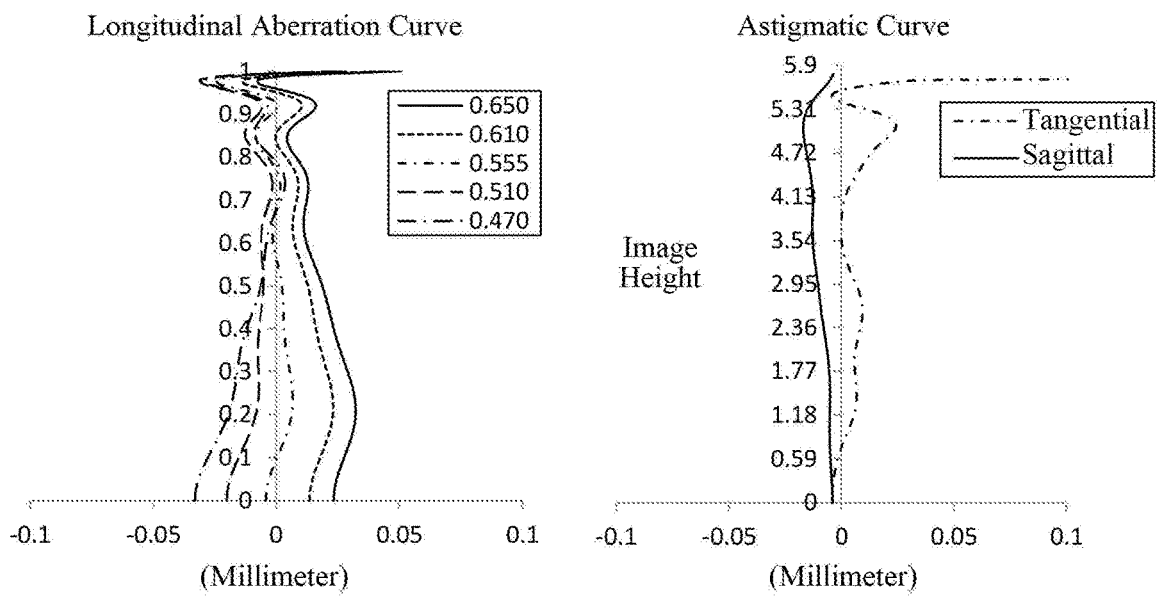
Fig. 10A
Fig. 10B

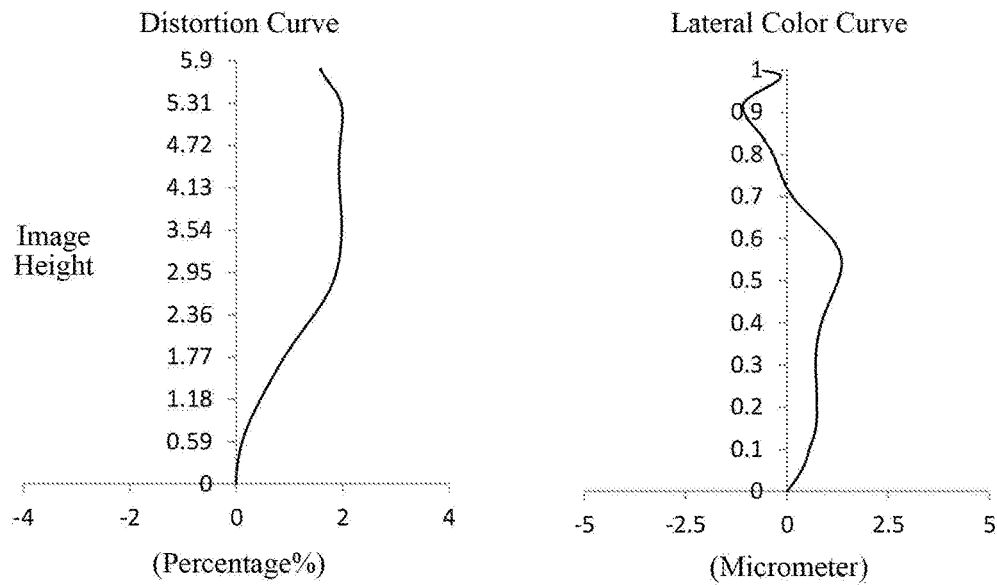
Fig. 10C
Fig. 10D
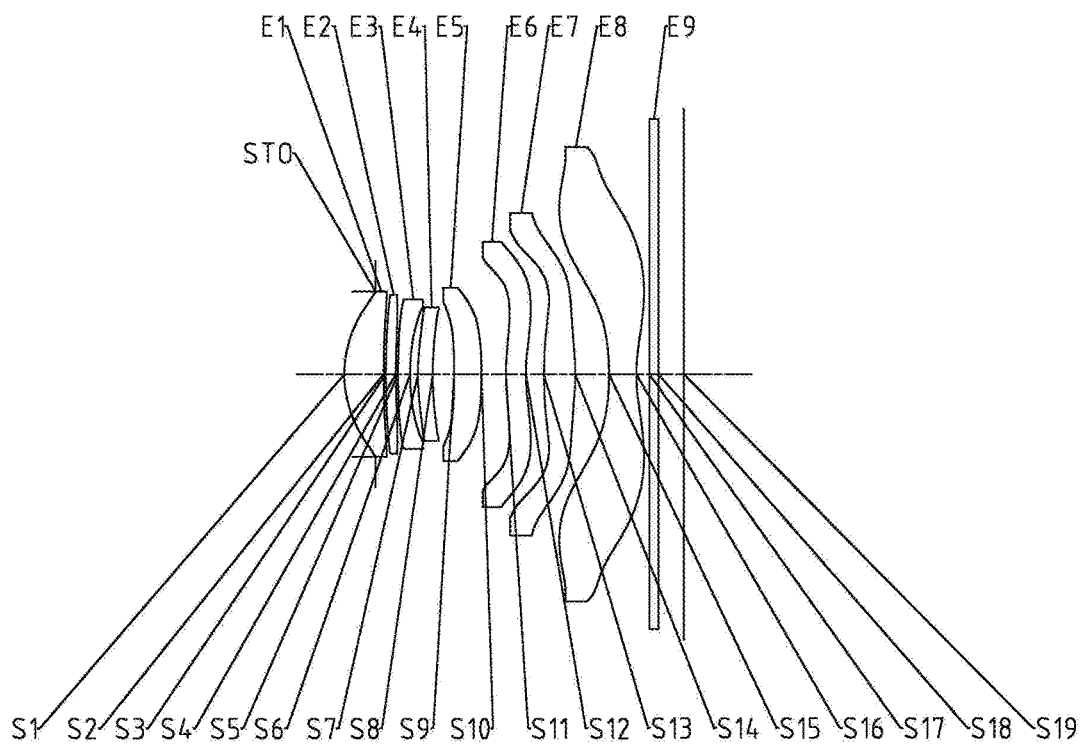
Fig. 11

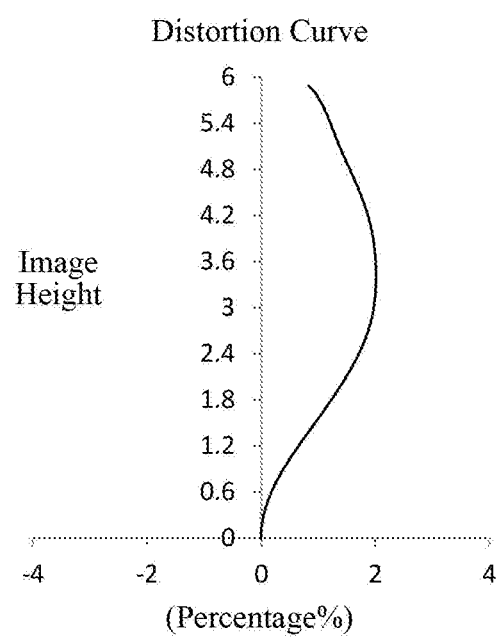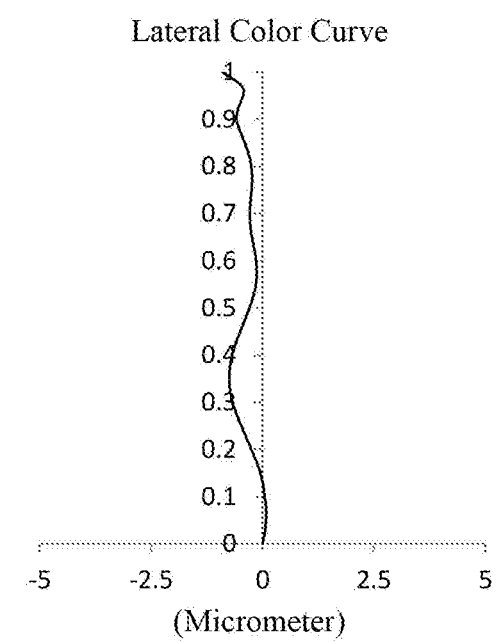
Fig. 14C
Fig. 14D

OPTICAL IMAGING LENS ASSEMBLY

CROSS-REFERENCE TO RELATED APPLICATION

This application claims benefit of priority to Chinese Patent Application No. 201911076595.8 filed on Nov. 6, 2019 before the China National Intellectual Property Administration, the entire disclosure of which is incorporated herein by reference in its entity.

TECHNICAL FIELD

The present disclosure relates to an optical imaging lens assembly, and more specifically, relates to an optical imaging lens assembly including eight lenses.

BACKGROUND

In recent years, with the rapid development of smart terminal devices such as mobile phones, their shooting functions have increasingly become a technological high ground for mobile phone manufacturers of various brands to compete. In order to improve the imaging quality of mobile phones, manufacturers continue to increase the pixels of the lens. At present, the pixels of most mobile phone lenses are already above 48 million pixels. In particular, the pixels of a lens with seven lenses can reach 64 million pixels. Even so, when shooting in some specific environments, it is still necessary to further increase the pixels of the lens, such as reaching more than 100 million pixels. Generally, the higher the pixels of an optical imaging lens are, the larger the imaging plane will be. Increasing the number of lenses in the lens assembly can effectively improve the imaging quality of the lens assembly, but it will also increase the total optical length of the lens assembly. However, in order to meet the development trend of thinner and lighter of the smart terminals, it is necessary to reduce the size of the lens assembly as much as possible while ensuring the imaging quality.

SUMMARY

The present disclosure provides an optical imaging lens assembly that is applicable to portable electronic products and at least solves or partially solves at least one of the above disadvantages of the prior art.

An aspect of the present disclosure provides an optical imaging lens assembly including, sequentially from an object side to an image side along an optical axis, a first lens having refractive power; a second lens having refractive power; a third lens having negative refractive power; a fourth lens having refractive power, and an object-side surface thereof is a convex surface; a fifth lens having refractive power, and an object-side surface thereof is a concave surface; a sixth lens having refractive power; a seventh lens having refractive power; and an eighth lens having refractive power.

In one embodiment, a total effective focal length f of the optical imaging lens assembly and half of a maximal field-of-view Semi-FOV of the optical imaging lens assembly satisfy: f*tan(Semi-FOV)>5.5 mm.

In one embodiment, a total effective focal length f of the optical imaging lens assembly and an effective focal length f1 of the first lens satisfy: 0.5<f/f1<1.5.

In one embodiment, a distance TTL along the optical axis from an object-side surface of the first lens to an imaging plane of the optical imaging lens assembly and half of a diagonal length ImgH of an effective pixel area on the imaging plane of the optical imaging lens assembly satisfy TTL/ImgH<1.4.

In one embodiment, a total effective focal length f of the optical imaging lens assembly and an entrance pupil diameter EPD of the optical imaging lens assembly satisfy f/EPD<2.

In one embodiment, a combined focal length f67 of the sixth lens and the seventh lens and a combined focal length f12345 of the first lens, the second lens, the third lens, the fourth lens and the fifth lens satisfy 0.5<f67/f12345<1.0.

In one embodiment, an edge thickness ET7 of the seventh lens and a center thickness CT7 of the seventh lens along the optical axis satisfy 0.5<ET7/CT7<1.0.

In one embodiment, a distance SAG51 along the optical axis from an intersection of an object-side surface of the fifth lens and the optical axis to a vertex of a effective radius of the object-side surface of the fifth lens and a distance SAG52 along the optical axis from an intersection of an image-side surface of the fifth lens and the optical axis to a vertex of a effective radius of the image-side surface of the fifth lens satisfy 0.3<SAG51/SAG52<0.8.

In one embodiment, a distance SAG61 along the optical axis from an intersection of an object-side surface of the sixth lens and the optical axis to a vertex of a effective radius of the object-side surface of the sixth lens and a distance SAG62 along the optical axis from an intersection of an image-side surface of the sixth lens and the optical axis to a vertex of a effective radius of the image-side surface of the sixth lens satisfy 0.5<SAG61/SAG62<1.0.

In one embodiment, a distance SAG71 along the optical axis from an intersection of an object-side surface of the seventh lens and the optical axis to a vertex of a effective radius of the object-side surface of the seventh lens and a distance SAG81 along the optical axis from an intersection of an object-side surface of the eighth lens and the optical axis to a vertex of a effective radius of the object-side surface of the eighth lens satisfy 0.5<SAG71/SAG81<1.0.

In one embodiment, an effective focal length f8 of the eighth lens and an effective focal length f3 of the third lens satisfy 0.2<f8/f3<0.7.

In one embodiment, a radius of curvature R2 of an image-side surface of the first lens and a radius of curvature R1 of an object-side surface of the first lens satisfy 0.2<(R2−R1)/(R2+R1)<1.0.

In one embodiment, a radius of curvature R6 of an image-side surface of the third lens and a radius of curvature R5 of an object-side surface of the third lens satisfy 0.2<R6/R5<0.7.

In one embodiment, a radius of curvature R8 of an image-side surface of the fourth lens and a radius of curvature R7 of the object-side surface of the fourth lens satisfy 0.5<R7/R8<1.5.

In one embodiment, a radius of curvature R12 of an image-side surface of the sixth lens and a radius of curvature R11 of an object-side surface of the sixth lens satisfy 0.7<R12/R11<1.2.

In one embodiment, an effective focal length f of the seventh lens, a radius of curvature R13 of an object-side surface of the seventh lens and a radius of curvature R14 of an image-side surface of the seventh lens satisfy 0.2<f7/(R13−R14)<0.7.

In one embodiment, a radius of curvature R16 of an image-side surface of the eighth lens and a radius of curvature R15 of an object-side surface of the eighth lens satisfy −1.5<R16/R15<−0.5.

In one embodiment, a center thickness CT5 of the fifth lens along the optical axis and a center thickness CT1 of the first lens along the optical axis satisfy 0.7<CT5/CT1<1.2.

In one embodiment, a spaced interval T45 between the fourth lens and the fifth lens along the optical axis, a spaced interval T56 between the fifth lens and the sixth lens along the optical axis and a spaced interval T67 between the sixth lens and the seventh lens along the optical axis satisfy 0.4<T56/(T45+T67)<0.9.

In one embodiment, a center thickness CT2 of the second lens along the optical axis, a center thickness CT3 of the third lens along the optical axis, a center thickness CT4 of the fourth lens along the optical axis, a center thickness CT6 of the sixth lens along the optical axis and a sum ΣAT of spaced intervals along the optical axis between each two adjacent lenses of the first to the eighth lenses satisfy 0.3<(CT2+CT3+CT4+CT6)/ΣAT<0.8.

In one embodiment, a center thickness CT8 of the eighth lens along the optical axis and a spaced interval T78 between the seventh lens and the eighth lens along the optical axis satisfy 0.5<CT8/T78<1.0.

In one embodiment, the first lens has positive refractive power.

In one embodiment, an object-side surface of the first lens is a convex surface, and an image-side surface thereof is a concave surface.

In one embodiment, an object-side surface of the sixth lens is a convex surface, and an image-side surface thereof is a concave surface.

In one embodiment, an object-side surface of the seventh lens is a convex surface, and an image-side surface thereof is a convex surface.

The optical imaging lens assembly provided by the present disclosure includes multiple lenses, such as the first lens to the eighth lens. By reasonably setting the relationship between the total effective focal length of the optical imaging lens assembly and half of the maximal field-of-view of the optical imaging lens assembly, setting the proportional relationship between the total effective focal length of the optical imaging lens and the effective focal length of the first lens, as well as optimizing the refractive power and surface shape of each lens, the optical imaging lens assembly may achieve a ultra-large imaging plane while being thin and light.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 1 illustrates a schematic structural view of an optical imaging lens assembly according to example 1 of the present disclosure;

FIGS. 2A to 2D illustrate a longitudinal aberration curve, an astigmatic curve, a distortion curve, and a lateral color curve of the optical imaging lens assembly of the example 1, respectively;

FIG. 3 illustrates a schematic structural view of an optical imaging lens assembly according to example 2 of the present disclosure;

FIGS. 6A to 6D illustrate a longitudinal aberration curve, an astigmatic curve, a distortion curve, and a lateral color curve of the optical imaging lens assembly of the example 3, respectively;

FIG. 7 illustrates a schematic structural view of an optical imaging lens assembly according to example 4 of the present disclosure;

FIG. 9 illustrates a schematic structural view of an optical imaging lens assembly according to example 5 of the present disclosure;

FIGS. 10A to 10D illustrate a longitudinal aberration curve, an astigmatic curve, a distortion curve, and a lateral color curve of the optical imaging lens assembly of the example 5, respectively;

FIG. 11 illustrates a schematic structural view of an optical imaging lens assembly according to example 6 of the present disclosure;

FIGS. 14A to 14D illustrate a longitudinal aberration curve, an astigmatic curve, a distortion curve, and a lateral color curve of the optical imaging lens assembly of the example 7, respectively.

DETAILED DESCRIPTION OF EMBODIMENTS

Figure 4A:
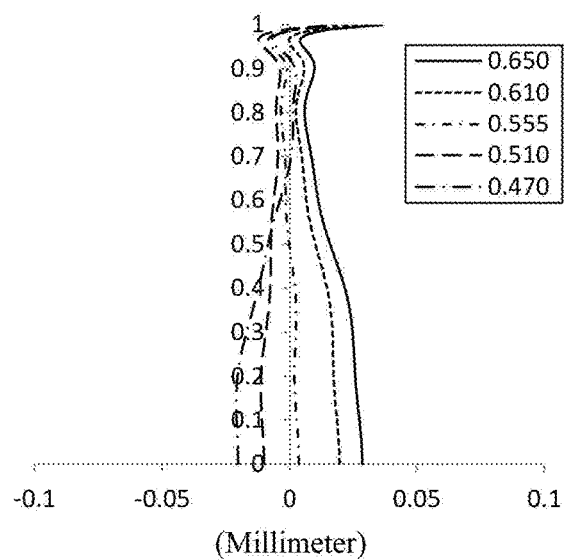
FIGS. 4A to 4D illustrate a longitudinal aberration curve, an astigmatic curve, a distortion curve, and a lateral color curve of the optical imaging lens assembly of the example 2, respectively.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include eight lenses, i.e. a first lens, a second lens, a third lens, a fourth lens, a fifth lens, a sixth lens, a seventh lens and an eighth lens. Each of the first to the eighth lenses has refractive power. The eight lenses are arranged sequentially from an object side to an image side along an optical axis, and there may be an air interval between adjacent lenses.

In an exemplary embodiment, the first lens may have positive refractive power; the second lens may have positive or negative refractive power, and an image-side surface thereof is a concave surface; the third lens may have negative refractive power; the fourth lens may have positive or negative refractive power, and an object-side surface thereof is a convex surface; the fifth lens may have positive or negative refractive power, and an object-side surface thereof is a concave surface; the sixth lens may have positive or negative refractive power; the seventh lens may have positive refractive power; and the eighth lens may have negative refractive power. By rationally configuring the refractive power and surface shape of each lens in the optical system, it is beneficial to realize a reasonable structure for the optical imaging lens assembly, realize ultra-clear photographing effects, and reduce the tolerance sensitivity of the optical system.

In an exemplary embodiment, an object-side surface of the first lens may be a convex surface, and an image-side surface thereof may be a concave surface.

In an exemplary embodiment, an object-side surface of the second lens may be a convex surface.

In an exemplary embodiment, an object-side surface of the third lens may be a convex surface, and an image-side surface thereof may be a concave surface.

In an exemplary embodiment, an image-side surface of the fourth lens may be a concave surface.

In an exemplary embodiment, an image-side surface of the fifth lens may be a convex surface.

In an exemplary embodiment, an object-side surface of the sixth lens may be a convex surface, and an image-side surface thereof may be a concave surface.

In an exemplary embodiment, an object-side surface of the seventh lens may be a convex surface, and an image-side surface thereof may be a convex surface.

In an exemplary embodiment, an object-side surface of the eighth lens may be a concave surface, and an image-side surface thereof may be a concave surface.

In an exemplary embodiment, a total effective focal length f of the optical imaging lens assembly and half of a maximal field-of-view Semi-FOV of the optical imaging lens assembly satisfy: $f*\tan(\text{Semi-FOV}) > 5.5$ mm, for example, $5.5$ mm $< f*\tan(\text{Semi-FOV}) < 6.0$ mm. By reasonably configuring f and Semi-FOV and making the two parameters satisfy the above conditional expression, it is beneficial for the optical system to have a large imaging plane and achieve ultra-clear imaging.

In an exemplary embodiment, a total effective focal length f of the optical imaging lens assembly and an effective focal length f1 of the first lens satisfy: $0.5 < f/f1 < 1.5$. By rationally configuring the ratio relationship between f and f1, it is beneficial to converge light at the object-side surface of the first lens and reduce the aperture of the first lens, so that the optical imaging lens assembly has an ultra-large imaging plane and ultra-thin characteristics.

In an exemplary embodiment, a distance TTL along the optical axis from an object-side surface of the first lens to an imaging plane of the optical imaging lens assembly and half of a diagonal length ImgH of an effective pixel area on the imaging plane of the optical imaging lens assembly satisfy $TTL/ImgH < 1.4$, for example, $1.2 < TTL/ImgH < 1.4$. By reasonably setting the ratio between TTL and ImgH, it is beneficial for the optical imaging lens assembly to have an ultra-large imaging plane while shortening the total length of the optical system, so that the optical imaging lens has both ultra-large imaging plane and ultra-thin characteristics.

In an exemplary embodiment, a total effective focal length f of the optical imaging lens assembly and an entrance pupil diameter EPD of the optical imaging lens assembly satisfy $f/EPD < 2$, for example, $1.5 < f/EPD < 2.0$. Reasonable configuring of the ratio between f and EPD makes the F number of the lens assembly less than 2, which is beneficial for the optical imaging lens assembly to have a better background blur function and a good night scene shooting function.

In an exemplary embodiment, a combined focal length f67 of the sixth lens and the seventh lens and a combined focal length f12345 of the first lens, the second lens, the third lens, the fourth lens and the fifth lens satisfy $0.5 < f67/f12345 < 1.0$. By reasonably setting the ratio between f67 and f12345, it is beneficial to distribute the refractive power of each lens reasonably in space, thereby reducing the aberrations of the optical system.

In an exemplary embodiment, an edge thickness ET7 of the seventh lens and a center thickness CT7 of the seventh lens along the optical axis satisfy $0.5 < ET7/CT7 < 1.0$. Reasonable setting of the ratio of ET7 to CT7 is beneficial to the processing and shaping of the seventh lens.

In an exemplary embodiment, a distance SAG51 along the optical axis from an intersection of an object-side surface of the fifth lens and the optical axis to a vertex of a effective radius of the object-side surface of the fifth lens and a distance SAG52 along the optical axis from an intersection of an image-side surface of the fifth lens and the optical axis to a vertex of a effective radius of the image-side surface of the fifth lens satisfy 0.3<SAG51/SAG52<0.8, for example, 0.3<SAG51/SAG52<0.6. Reasonably configuring the ratio of the vector height of the object-side surface of the fifth lens to the vector height of the image-side surface of the fifth lens, it is not only beneficial to the manufacturing and molding of the fifth lens, but also beneficial to enlarge the imaging plane of the optical system.

In an exemplary embodiment, a distance SAG61 along the optical axis from an intersection of an object-side surface of the sixth lens and the optical axis to a vertex of a effective radius of the object-side surface of the sixth lens and a distance SAG62 along the optical axis from an intersection of an image-side surface of the sixth lens and the optical axis to a vertex of a effective radius of the image-side surface of the sixth lens satisfy 0.5<SAG61/SAG62<1.0. Reasonably configuring the ratio of the vector height of the object-side surface of the sixth lens to the vector height of the image-side surface of the sixth lens, it is not only beneficial to the manufacturing and molding of the sixth lens, but also beneficial to enlarge the imaging plane of the optical system.

In an exemplary embodiment, a distance SAG71 along the optical axis from an intersection of an object-side surface of the seventh lens and the optical axis to a vertex of a effective radius of the object-side surface of the seventh lens and a distance SAG81 along the optical axis from an intersection of an object-side surface of the eighth lens and the optical axis to a vertex of a effective radius of the object-side surface of the eighth lens satisfy 0.5<SAG71/SAG81<1.0. By controlling the ratio of the sagittal height of the object-side surface of the seventh lens to the sagittal height of the object-side surface of the eighth lens within a reasonable value range, the degree of curvature of the two lenses can be limited, and the processing and molding difficulty of the lenses can be reduced.

In an exemplary embodiment, an effective focal length f8 of the eighth lens and an effective focal length f3 of the third lens satisfy 0.2<f8/f3<0.7, for example, 0.2<f8/f3<0.5. By reasonably configuring the ratio of f8 to f3, the refractive power can be configured reasonably and aberrations of the optical system can be reduced.

In an exemplary embodiment, a radius of curvature R2 of an image-side surface of the first lens and a radius of curvature R1 of an object-side surface of the first lens satisfy 0.2<(R2−R1)/(R2+R1)<1.0, for example, 0.2<(R2−R1)/(R2+R1)<0.8. Reasonable configuration of R1 and R2 can prevent the effective focal length of the first lens from being too large, and avoid the refractive power of the optical system from being too concentrated on the first lens, which is conducive to high-definition imaging of the optical imaging lens.

In an exemplary embodiment, a radius of curvature R6 of an image-side surface of the third lens and a radius of curvature R5 of an object-side surface of the third lens satisfy 0.2<R6/R5<0.7, for example, 0.2<R6/R5<0.5. By limiting the ratio of R6 to R5 within a reasonable numerical range, the aberration contribution of the third lens to the optical system can be controlled within a reasonable range.

In an exemplary embodiment, a radius of curvature R8 of an image-side surface of the fourth lens and a radius of curvature R7 of an object-side surface of the fourth lens satisfy 0.5<R7/R8<1.5. By limiting the ratio of R7 to R8 within a reasonable numerical range, the aberration contribution of the fourth lens to the optical system can be controlled within a reasonable range.

In an exemplary embodiment, a radius of curvature R12 of an image-side surface of the sixth lens and a radius of curvature R1 of an object-side surface of the sixth lens satisfy 0.7<R12/R11<1.2. By limiting the ratio of R12 to R11 within a reasonable numerical range, the aberration contribution of the sixth lens to the optical system can be controlled within a reasonable range.

In an exemplary embodiment, an effective focal length f7 of the seventh lens, a radius of curvature R13 of an object-side surface of the seventh lens and a radius of curvature R14 of an image-side surface of the seventh lens satisfy 0.2<f7/(R13−R14)<0.7, for example, 0.3<f7/(R13−R14)<0.5. By reasonably setting f, R13 and R14 and limiting the three parameters satisfy the above conditional expression, it is not only beneficial to avoid excessive bending of the seventh lens, but also beneficial to the processing and shaping of the seventh lens.

In an exemplary embodiment, a radius of curvature R16 of an image-side surface of the eighth lens and a radius of curvature R15 of an object-side surface of the eighth lens satisfy −1.5<R16/R15<−0.5, for example, −1.0<R16/R15<−0.6. By limiting the ratio of R16 to R15 within a reasonable numerical range, the aberration contribution of the eighth lens to the optical system can be controlled within a reasonable range.

In an exemplary embodiment, a center thickness CT5 of the fifth lens along the optical axis and a center thickness CT1 of the first lens along the optical axis satisfy 0.7<CT5/CT1<1.2, for example, 0.7<CT5/CT1<1.0. Limiting the ratio of CT5 to CT1 within a reasonable value range not only facilitates the manufacturing and molding of the lens, but also helps reduce the thickness of the front end of the optical imaging lens assembly.

In an exemplary embodiment, a spaced interval T45 between the fourth lens and the fifth lens along the optical axis, a spaced interval T56 between the fifth lens and the sixth lens along the optical axis and a spaced interval T67 between the sixth lens and the seventh lens along the optical axis satisfy 0.4<T56/(T45+T67)<0.9. By reasonably setting T45, T56 and T67 and limiting the three parameters satisfy the above conditional expression, it is beneficial to realizing a rational distribution of the fifth lens, the sixth lens and the seventh lens in the spatial position along the optical axis.

In an exemplary embodiment, a center thickness CT2 of the second lens along the optical axis, a center thickness CT3 of the third lens along the optical axis, a center thickness CT4 of the fourth lens along the optical axis, a center thickness CT6 of the sixth lens along the optical axis and a sum ΣAT of spaced intervals along the optical axis between each two adjacent lenses of the first to the eighth lenses satisfy 0.3<(CT2+CT3+CT4+CT6)/ΣAT<0.8, for example, 0.4<(CT2+CT3+CT4+CT6)/ΣAT<0.6. Reasonably setting the center thickness of each lens and the spaced interval between the lenses is beneficial to realizing the ultra-thinness of the entire lens group.

In an exemplary embodiment, a center thickness CT8 of the eighth lens along the optical axis and a spaced interval T78 between the seventh lens and the eighth lens along the optical axis satisfy 0.5<CT8/T78<1.0. By limiting the ratio of CT8 to T78, it is possible to prevent the installation space for lens from being affected by the excessive thickness of the eighth lens, thereby facilitating the assembly of the optical imaging lens assembly.

In an exemplary embodiment, the above optical imaging lens assembly may further include a stop. The stop may be disposed at an appropriate position as required. For example, the stop is disposed between the object side and the first lens and near the object-side surface of the first lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as eight lenses as described above. The optical imaging lens assembly of the present disclosure may satisfy the requirements of ultra-large imaging plane, ultra-thinness and the like. The optical imaging lens has compact structure, good processability, high product yield, and can perform ultra-clear and high-quality photography, so it can be applied to highly integrated electronic devices.

In an exemplary embodiment, at least one of the surfaces of lenses is aspheric, that is, at least one of the object-side surface of the first lens to the image-side surface of the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens and the eighth lens is aspheric. Optionally, the object-side surface and the image-side surface of each of the first lens, the second lens, the third lens, the fourth lens, the fifth lens, the sixth lens, the seventh lens and the eighth lens are aspheric.

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

Exemplary embodiments of the present disclosure also provide an electronic device including the above-described imaging apparatus.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to Example 1 of the present disclosure is described below with reference to FIG. 1 to FIG. 2D. FIG. 1 shows a schematic structural view of the optical imaging lens assembly according to Example 1 of the present disclosure.

As shown in FIG. 1, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S5 to S18 and is finally imaged on the imaging plane S19.

Table 1 is a table illustrating the basic parameters of the optical imaging lens assembly of Example 1, wherein the units of the radius of curvature, the thickness/distance and the focal length are all in millimeter (mm).

TABLE 1

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7756 | | | | |
| S1 | Aspheric | 2.6599 | 0.7887 | 1.55 | 56.1 | 7.27 | 0.2819 |
| S2 | Aspheric | 7.2168 | 0.0564 | | | | 0.0000 |
| S3 | Aspheric | 6.6688 | 0.4244 | 1.55 | 56.1 | 26.20 | 0.0000 |
| S4 | Aspheric | 12.2129 | 0.0532 | | | | 4.1633 |
| S5 | Aspheric | 13.6306 | 0.2400 | 1.67 | 19.2 | −11.67 | 38.7859 |

TABLE 1-continued

| Surface number | Surface type | Radius of curvature | Thickness/ Distance | Material Refractive index | Material Abbe number | Focal length | Conic coefficient |
|---|---|---|---|---|---|---|---|
| S6 | Aspheric | 4.9687 | 0.2350 | | | | 1.5961 |
| S7 | Aspheric | 6.5081 | 0.3303 | 1.65 | 23.5 | 36.64 | 0.0442 |
| S8 | Aspheric | 8.8113 | 0.5033 | | | | 12.0138 |
| S9 | Aspheric | −16.3522 | 0.5869 | 1.55 | 56.1 | −99.33 | 38.8082 |
| S10 | Aspheric | −23.7083 | 0.4268 | | | | 0.0000 |
| S11 | Aspheric | 4.3549 | 0.4498 | 1.67 | 20.4 | −188.75 | 0.0000 |
| S12 | Aspheric | 4.0353 | 0.4874 | | | | −17.4654 |
| S13 | Aspheric | 8.6827 | 0.6564 | 1.55 | 56.1 | 6.20 | 0.0000 |
| S14 | Aspheric | −5.3954 | 0.9307 | | | | 0.0000 |
| S15 | Aspheric | −5.5189 | 0.5545 | 1.54 | 55.9 | −4.37 | 0.0000 |
| S16 | Aspheric | 4.2200 | 0.2930 | | | | −1.0000 |
| S17 | Spherical | Infinite | 0.2100 | 1.52 | 64.2 | | |
| S18 | Spherical | Infinite | 0.5732 | | | | |
| S19 | Spherical | Infinite | | | | | |

In this example, a total effective focal length f of the optical imaging lens assembly satisfies f=6.61 mm, a distance TTL along the optical axis from the object-side surface S1 of the first lens E1 to an imaging plane S19 of the optical imaging lens assembly satisfies TTL=7.80 mm, half of a diagonal length ImgH of an effective pixel area on the imaging plane S19 of the optical imaging lens assembly satisfies ImgH=5.90 mm, and half of a maximal field-of-view Semi-FOV of the optical imaging lens assembly satisfies Semi-FOV=41.20.

In Example 1, the object-side surface and the image-side surface of any one of the first lens E1 to the eighth lens E8 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order. Table 2 below shows high-order coefficients A4, A6, A8, A10, A12, A14, A16, A18, A20, A22, A24, A26, A28 and A30 applicable to each aspheric surface S1 to S16 in Example 1.

TABLE 2

| Surface number | A4 | A6 | A8 | A10 | A12 | A14 | A16 |
|---|---|---|---|---|---|---|---|
| S1 | −2.7193E−03 | −1.6563E−04 | −2.4946E−04 | −1.3026E−04 | 2.5134E−04 | −1.7730E−04 | 6.1027E−05 |
| S2 | 4.3938E−03 | −1.2181E−02 | 1.5783E−02 | −1.4808E−02 | 9.7826E−03 | −4.2431E−03 | 1.1354E−03 |
| S3 | 7.9655E−03 | −1.5219E−02 | 1.7271E−02 | −1.6195E−02 | 1.1212E−02 | −5.1554E−03 | 1.4547E−03 |
| S4 | −4.7311E−03 | −2.3530E−02 | 3.1067E−02 | −2.1821E−02 | 9.6297E−03 | −2.8926E−03 | 6.2311E−04 |
| S5 | −1.1076E−02 | −1.1961E−02 | 2.9890E−02 | −2.4823E−02 | 1.1812E−02 | −3.5659E−03 | 7.3498E−04 |
| S6 | −5.3987E−03 | 8.7844E−04 | 1.2776E−02 | −1.3736E−02 | 5.9925E−03 | −2.1682E−05 | −1.0664E−03 |
| S7 | −1.2294E−02 | 7.6407E−03 | −3.5161E−02 | 6.5232E−02 | −7.1674E−02 | 4.8253E−02 | −1.9428E−02 |
| S8 | −8.4432E−03 | −1.2714E−03 | −1.8127E−03 | 3.0499E−04 | 1.9214E−03 | −1.9407E−03 | 9.1302E−04 |
| S9 | −1.6829E−02 | 3.3766E−03 | −1.1572E−02 | 1.4810E−02 | −1.4238E−02 | 9.0997E−03 | −3.6193E−03 |
| S10 | −3.0979E−02 | 5.6221E−03 | 2.9877E−03 | −7.9243E−03 | 5.5225E−03 | −2.0197E−03 | 4.0775E−04 |
| S11 | −5.3135E−02 | 1.2631E−02 | −1.9511E−04 | −1.1037E−03 | 1.3605E−04 | 6.8931E−05 | −2.4351E−05 |
| S12 | −1.6466E−02 | −1.0407E−02 | 1.0820E−02 | −4.6107E−03 | 1.0781E−03 | −1.4807E−04 | 1.1726E−05 |
| S13 | 1.6414E−02 | −1.4212E−02 | 4.6060E−03 | −1.0042E−03 | 1.3090E−04 | −1.0422E−05 | 5.5569E−07 |
| S14 | 4.1353E−02 | −1.0117E−02 | 1.3243E−03 | −1.0385E−04 | −7.2461E−06 | 3.0911E−06 | −3.3047E−07 |
| S15 | −1.2531E−02 | −2.8962E−03 | 3.4080E−03 | −1.3143E−03 | 3.0525E−04 | −4.6576E−05 | 4.8784E−06 |
| S16 | −3.7247E−02 | 7.8421E−03 | −1.5447E−03 | 2.9376E−04 | −5.6156E−05 | 9.2202E−06 | −1.1379E−06 |

| Surface number | A18 | A20 | A22 | A24 | A26 | A28 | A30 |
|---|---|---|---|---|---|---|---|
| S1 | −1.0617E−05 | 7.0263E−07 | 0.0000E+00 | 0.0000E+00 | 0.0000E+00 | 0.0000E+00 | 0.0000E+00 |
| S2 | −1.6880E−04 | 1.0580E−05 | 0.0000E+00 | 0.0000E+00 | 0.0000E+00 | 0.0000E+00 | 0.0000E+00 |
| S3 | −2.2478E−04 | 1.4456E−05 | 0.0000E+00 | 0.0000E+00 | 0.0000E+00 | 0.0000E+00 | 0.0000E+00 |
| S4 | −8.9816E−05 | 6.2150E−06 | 0.0000E+00 | 0.0000E+00 | 0.0000E+00 | 0.0000E+00 | 0.0000E+00 |
| S5 | −1.0306E−04 | 7.3847E−06 | 0.0000E+00 | 0.0000E+00 | 0.0000E+00 | 0.0000E+00 | 0.0000E+00 |
| S6 | 4.0892E−04 | −4.9152E−05 | 0.0000E+00 | 0.0000E+00 | 0.0000E+00 | 0.0000E+00 | 0.0000E+00 |
| S7 | 4.3084E−03 | −4.0311E−04 | 0.0000E+00 | 0.0000E+00 | 0.0000E+00 | 0.0000E+00 | 0.0000E+00 |
| S8 | −1.9801E−04 | 1.5858E−05 | 0.0000E+00 | 0.0000E+00 | 0.0000E+00 | 0.0000E+00 | 0.0000E+00 |
| S9 | 8.1069E−04 | −7.6901E−05 | 0.0000E+00 | 0.0000E+00 | 0.0000E+00 | 0.0000E+00 | 0.0000E+00 |
| S10 | −4.0368E−05 | 1.3516E−06 | 0.0000E+00 | 0.0000E+00 | 0.0000E+00 | 0.0000E+00 | 0.0000E+00 |
| S11 | 2.9955E−06 | −1.3244E−07 | 0.0000E+00 | 0.0000E+00 | 0.0000E+00 | 0.0000E+00 | 0.0000E+00 |
| S12 | −4.8119E−07 | 7.4650E−09 | 0.0000E+00 | 0.0000E+00 | 0.0000E+00 | 0.0000E+00 | 0.0000E+00 |
| S13 | −2.0300E−08 | 3.7945E−10 | 0.0000E+00 | 0.0000E+00 | 0.0000E+00 | 0.0000E+00 | 0.0000E+00 |

TABLE 2-continued

| | | | | | | | |
|---|---|---|---|---|---|---|---|
| S14 | 1.5654E−08 | −2.8296E−10 | 0.0000E+00 | 0.0000E+00 | 0.0000E+00 | 0.0000E+00 | 0.0000E+00 |
| S15 | −3.6012E−07 | 1.8950E−08 | −7.0819E−10 | 1.8389E−11 | −3.1573E−13 | 3.2255E−15 | −1.4854E−17 |
| S16 | 1.0059E−07 | −6.2808E−09 | 2.7371E−10 | −8.1299E−12 | 1.5670E−13 | −1.7656E−15 | 8.8226E−18 |

FIG. 2A illustrates a longitudinal aberration curve of the optical imaging lens assembly according to Example 1, representing deviations of focal points converged by light of different wavelengths after passing through the lens assembly. FIG. 2B illustrates an astigmatic curve of the optical imaging lens assembly according to Example 1, representing a curvature of a tangential plane and a curvature of a sagittal plane. FIG. 2C illustrates a distortion curve of the optical imaging lens assembly according to Example 1, representing amounts of distortion corresponding to different image heights. FIG. 2D illustrates a lateral color curve of the optical imaging lens assembly according to Example 1, representing deviations of different image heights on an imaging plane after light passes through the lens assembly. It can be seen from FIG. 2A to FIG. 2D that the optical imaging lens assembly provided in Example 1 may achieve good image quality.

Example 2

An optical imaging lens assembly according to Example 2 of the present disclosure is described below with reference to FIG. 3 to FIG. 4D. FIG. 3 shows a schematic structural view of the optical imaging lens assembly according to Example 2 of the present disclosure.

As shown in FIG. 3, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly satisfies f=6.53 mm, a distance TTL along the optical axis from the object-side surface S1 of the first lens E1 to an imaging plane S9 of the optical imaging lens assembly satisfies TTL=7.60 mm, half of a diagonal length ImgH of an effective pixel area on the imaging plane S19 of the optical imaging lens assembly satisfies ImgH=5.90 mm, and half of a maximal field-of-view Semi-FOV of the optical imaging lens assembly satisfies Semi-FOV=41.8°.

Table 3 is a table illustrating the basic parameters of the optical imaging lens assembly of Example 2, wherein the units of the radius of curvature, the thickness/distance and the focal length are all in millimeter (mm).

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6283 | | | | |
| S1 | Aspheric | 2.6239 | 0.6934 | 1.55 | 56.1 | 7.84 | 0.4620 |
| S2 | Aspheric | 6.1418 | 0.0642 | | | | 0.0000 |
| S3 | Aspheric | 5.9910 | 0.3774 | 1.55 | 56.1 | 20.45 | 0.0000 |
| S4 | Aspheric | 12.6443 | 0.0622 | | | | 1.1118 |
| S5 | Aspheric | 14.4543 | 0.2400 | 1.67 | 19.2 | −12.09 | 51.9144 |
| S6 | Aspheric | 5.1928 | 0.2382 | | | | 1.2968 |
| S7 | Aspheric | 6.3901 | 0.2994 | 1.65 | 23.5 | 65.34 | 0.6191 |
| S8 | Aspheric | 7.3972 | 0.4368 | | | | 8.1534 |
| S9 | Aspheric | −16.3176 | 0.5652 | 1.55 | 56.1 | 95.23 | 45.2434 |
| S10 | Aspheric | −12.5714 | 0.5292 | | | | 0.0000 |
| S11 | Aspheric | 4.1415 | 0.3414 | 1.67 | 20.4 | 94.53 | 0.0000 |
| S12 | Aspheric | 4.2871 | 0.6111 | | | | −14.1105 |
| S13 | Aspheric | 11.1734 | 0.5048 | 1.55 | 56.1 | 7.35 | 0.0000 |
| S14 | Aspheric | −6.1654 | 0.9867 | | | | 0.0000 |
| S15 | Aspheric | −5.4169 | 0.5729 | 1.54 | 55.9 | −4.24 | 0.0000 |
| S16 | Aspheric | 4.0727 | 0.2920 | | | | −1.0000 |
| S17 | Spherical | Infinite | 0.2100 | 1.52 | 64.2 | | |
| S18 | Spherical | Infinite | 0.5772 | | | | |
| S19 | Spherical | Infinite | | | | | |

In Example 2, the object-side surface and the image-side surface of any one of the first lens E1 to the eighth lens E8 are aspheric. Table 4 below shows high-order coefficients A4, A6, A8, A10, A12, A14, A16, A18, A20, A22, A24, A26, A28 and A30 applicable to each aspheric surface S1 to S16 in Example 2.

TABLE 4

| Surface number | A4 | A6 | A8 | A10 | A12 | A14 | A16 |
|---|---|---|---|---|---|---|---|
| S1 | −3.6867E−03 | −1.6349E−03 | 2.5098E−03 | −3.8366E−03 | 3.1472E−03 | −1.5275E−03 | 4.2639E−04 |
| S2 | 5.0182E−03 | −8.2267E−03 | −1.7265E−03 | 1.0882E−02 | −1.0275E−02 | 4.8751E−03 | −1.2680E−03 |
| S3 | 1.1739E−02 | −1.4297E−02 | 1.6860E−04 | 1.2866E−02 | −1.3322E−02 | 6.5327E−03 | −1.7164E−03 |
| S4 | 5.0971E−03 | −3.7992E−02 | 3.3797E−02 | −2.4446E−03 | −1.8211E−02 | 1.5206E−02 | −5.6913E−03 |
| S5 | −3.0997E−03 | −3.2429E−02 | 4.5143E−02 | −1.6945E−02 | −1.1289E−02 | 1.4798E−02 | −6.5763E−03 |
| S6 | −3.0918E−04 | −1.2371E−02 | 3.1002E−02 | −1.3176E−02 | 2.1985E−02 | −1.2709E−02 | 5.7586E−03 |
| S7 | −8.8908E−03 | −1.6227E−02 | 2.8244E−02 | −4.2730E−02 | 4.3794E−02 | −2.8669E−02 | 1.1537E−02 |
| S8 | −8.8172E−03 | −6.5258E−03 | 3.5116E−03 | −9.0200E−04 | −1.6150E−03 | 2.4589E−03 | −1.4168E−03 |
| S9 | −1.9128E−02 | 2.8400E−03 | −1.6936E−02 | 3.0172E−02 | −3.4898E−02 | 2.4746E−02 | −1.0511E−02 |
| S10 | −2.9464E−02 | 1.8728E−03 | 1.1379E−02 | −2.6056E−03 | 9.0566E−04 | 2.4451E−04 | −2.6532E−04 |
| S11 | −3.9750E−03 | −3.7422E−03 | 1.0067E−02 | −5.3137E−03 | 1.2224E−03 | −9.9168E−05 | −1.0478E−05 |
| S12 | −1.1072E−02 | −2.0462E−02 | 1.8623E−02 | −8.2323E−03 | 2.0837E−03 | −3.1651E−04 | 2.8229E−05 |
| S13 | 3.0060E−02 | −2.1161E−02 | 6.5404E−03 | −1.3862E−03 | 1.9710E−04 | −1.9817E−05 | 1.4203E−06 |
| S14 | 5.1006E−02 | −1.5523E−02 | 2.1651E−03 | −4.6319E−05 | −4.6508E−05 | 9.2419E−06 | −8.1420E−07 |
| S15 | −1.7164E−02 | 7.2224E−04 | 2.5020E−03 | −1.4183E−03 | 4.1465E−04 | −7.4969E−05 | 9.0473E−06 |
| S16 | −4.6107E−02 | 1.4734E−02 | −4.6051E−03 | 1.2262E−03 | −2.6047E−04 | 4.1807E−05 | −4.9350E−06 |

| Surface number | A18 | A20 | A22 | A24 | A26 | A28 | A30 |
|---|---|---|---|---|---|---|---|
| S1 | −6.2662E−05 | 3.6237E−06 | 0.0000E+00 | 0.0000E+00 | 0.0000E+00 | 0.0000E+00 | 0.0000E+00 |
| S2 | 1.7178E−04 | −9.5373E−06 | 0.0000E+00 | 0.0000E+00 | 0.0000E+00 | 0.0000E+00 | 0.0000E+00 |
| S3 | 2.3115E−04 | −1.2432E−05 | 0.0000E+00 | 0.0000E+00 | 0.0000E+00 | 0.0000E+00 | 0.0000E+00 |
| S4 | 1.0518E−03 | −7.7661E−05 | 0.0000E+00 | 0.0000E+00 | 0.0000E+00 | 0.0000E+00 | 0.0000E+00 |
| S5 | 1.3757E−03 | −1.1363E−04 | 0.0000E+00 | 0.0000E+00 | 0.0000E+00 | 0.0000E+00 | 0.0000E+00 |
| S6 | −1.6121E−03 | 1.9682E−04 | 0.0000E+00 | 0.0000E+00 | 0.0000E+00 | 0.0000E+00 | 0.0000E+00 |
| S7 | −2.5558E−03 | 2.3838E−04 | 0.0000E+00 | 0.0000E+00 | 0.0000E+00 | 0.0000E+00 | 0.0000E+00 |
| S8 | 4.2126E−04 | −5.1549E−05 | 0.0000E+00 | 0.0000E+00 | 0.0000E+00 | 0.0000E+00 | 0.0000E+00 |
| S9 | 2.4644E−03 | −2.4265E−04 | 0.0000E+00 | 0.0000E+00 | 0.0000E+00 | 0.0000E+00 | 0.0000E+00 |
| S10 | 7.3716E−05 | −6.9917E−06 | 0.0000E+00 | 0.0000E+00 | 0.0000E+00 | 0.0000E+00 | 0.0000E+00 |
| S11 | 2.5898E−06 | −1.3954E−07 | 0.0000E+00 | 0.0000E+00 | 0.0000E+00 | 0.0000E+00 | 0.0000E+00 |
| S12 | −1.3361E−06 | 2.5023E−08 | 0.0000E+00 | 0.0000E+00 | 0.0000E+00 | 0.0000E+00 | 0.0000E+00 |
| S13 | −6.2905E−08 | 1.2199E−09 | 0.0000E+00 | 0.0000E+00 | 0.0000E+00 | 0.0000E+00 | 0.0000E+00 |
| S14 | 3.5244E−08 | −6.0819E−10 | 0.0000E+00 | 0.0000E+00 | 0.0000E+00 | 0.0000E+00 | 0.0000E+00 |
| S15 | −7.5913E−07 | 4.5105E−08 | −1.8975E−09 | 5.5407E−11 | −1.0700E−12 | 1.2302E−14 | −6.3822E−17 |
| S16 | 4.2361E−07 | −2.6219E−08 | 1.1536E−09 | −3.5114E−11 | 7.0193E−13 | −8.2836E−15 | 4.3716E−17 |

Figure 4B:
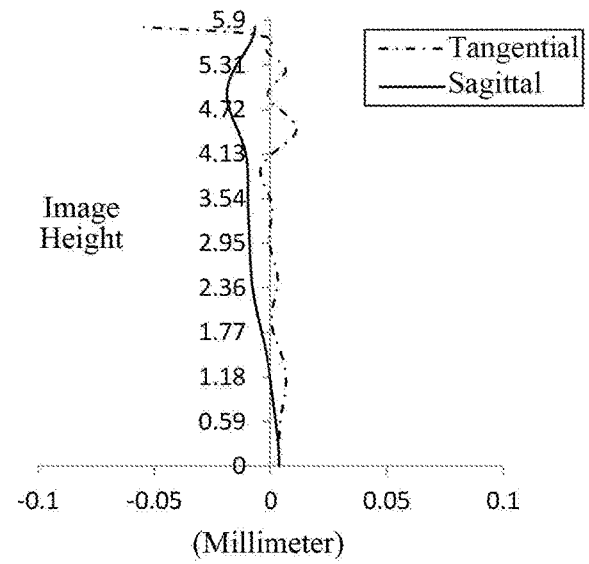
Figure 4C:
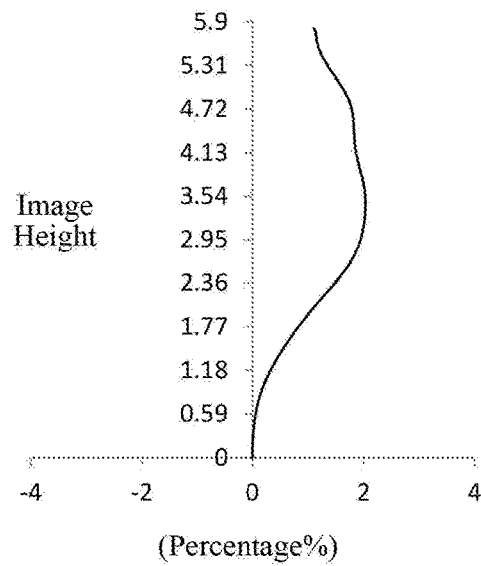
Figure 4D:
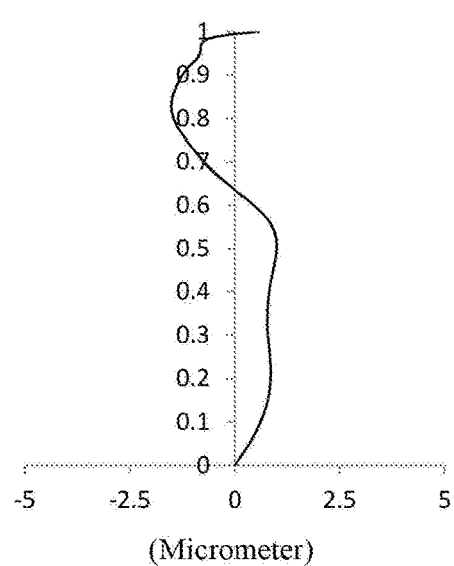

FIG. 4A illustrates a longitudinal aberration curve of the optical imaging lens assembly according to Example 2, representing deviations of focal points converged by light of different wavelengths after passing through the lens assembly. FIG. 4B illustrates an astigmatic curve of the optical imaging lens assembly according to Example 2, representing a curvature of a tangential plane and a curvature of a sagittal plane. FIG. 4C illustrates a distortion curve of the optical imaging lens assembly according to Example 2, representing amounts of distortion corresponding to different image heights. FIG. 4D illustrates a lateral color curve of the optical imaging lens assembly according to Example 2, representing deviations of different image heights on an imaging plane after light passes through the lens assembly. It can be seen from FIG. 4A to FIG. 4D that the optical imaging lens assembly provided in Example 2 may achieve good image quality.

Example 3

Figure 5:
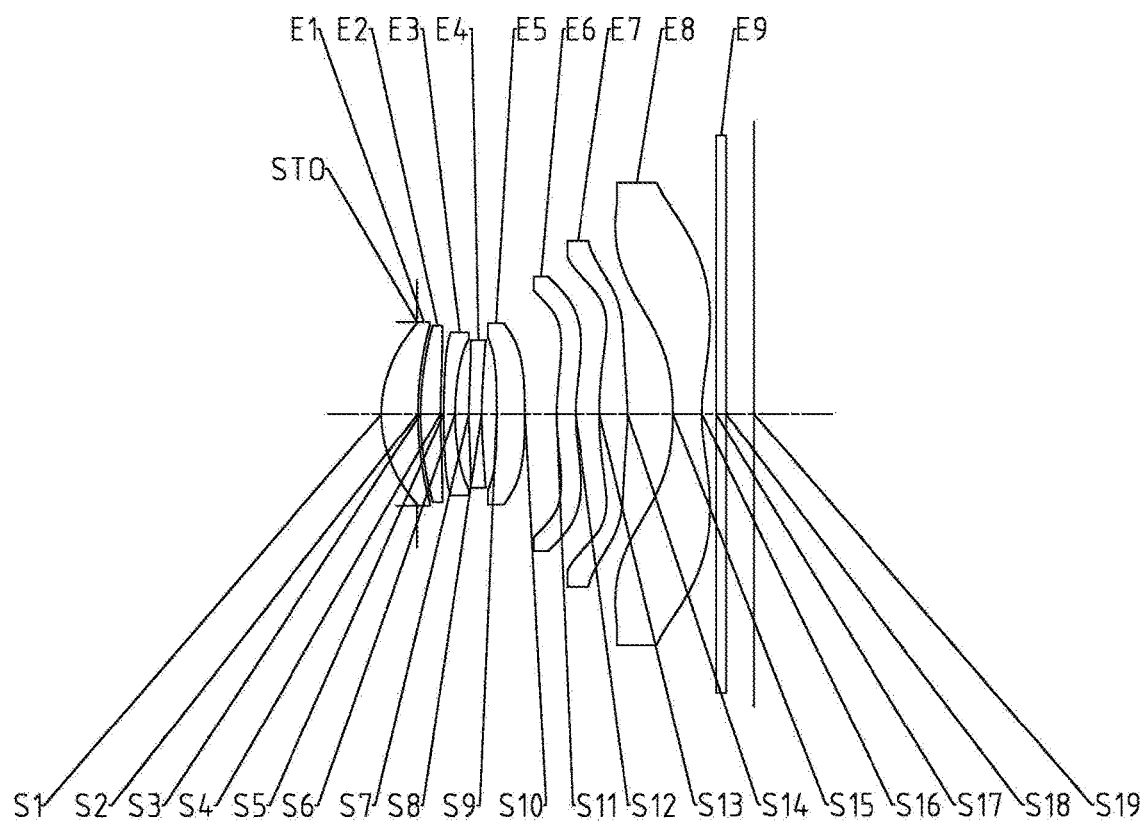
FIG. 5 illustrates a schematic structural view of an optical imaging lens assembly according to example 3 of the present disclosure.

An optical imaging lens assembly according to Example 3 of the present disclosure is described below with reference to FIG. 5 to FIG. 6D. FIG. 5 shows a schematic structural view of the optical imaging lens assembly according to Example 3 of the present disclosure.

As shown in FIG. 5, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S to S18 and is finally imaged on the imaging plane S19.

In this example, a total effective focal length f of the optical imaging lens assembly satisfies f=6.62 mm, a distance TTL along the optical axis from the object-side surface Sb of the first lens E1 to an imaging plane S19 of the optical imaging lens assembly satisfies TTL=7.80 mm, half of diagonal length ImgH of an effective pixel area on the imaging plane S19 of the optical imaging lens assembly satisfies ImgH=5.80 mm, and half of a maximal field-of-view Semi-FOV of the optical imaging lens assembly satisfies Semi-FOV=40.8°.

Table 5 is a table illustrating the basic parameters of the optical imaging lens assembly of Example 3, wherein the units of the radius of curvature, the thickness/distance and the focal length are all in millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7487 | | | | |
| S1 | Aspheric | 2.6870 | 0.7633 | 1.55 | 56.1 | 7.63 | 0.3684 |
| S2 | Aspheric | 6.8056 | 0.0565 | | | | 0.0000 |
| S3 | Aspheric | 6.6703 | 0.4175 | 1.55 | 56.1 | 24.91 | 0.0000 |
| S4 | Aspheric | 12.8015 | 0.0652 | | | | 4.3502 |
| S5 | Aspheric | 13.7035 | 0.2400 | 1.67 | 19.2 | −15.55 | 50.2043 |
| S6 | Aspheric | 5.9145 | 0.2876 | | | | 4.7169 |
| S7 | Aspheric | 10.7332 | 0.2681 | 1.65 | 23.5 | −88.81 | −1.6571 |
| S8 | Aspheric | 8.9476 | 0.3128 | | | | 8.1221 |
| S9 | Aspheric | −54.7636 | 0.5902 | 1.55 | 56.1 | 38.26 | 99.0000 |
| S10 | Aspheric | −15.1791 | 0.6605 | | | | 0.0000 |
| S11 | Aspheric | 4.6741 | 0.4018 | 1.67 | 20.4 | −92.59 | 0.0000 |
| S12 | Aspheric | 4.1953 | 0.5034 | | | | −15.3878 |
| S13 | Aspheric | 9.0141 | 0.5896 | 1.55 | 56.1 | 6.53 | 0.0000 |
| S14 | Aspheric | −5.7623 | 0.9519 | | | | 0.0000 |
| S15 | Aspheric | −5.4496 | 0.6015 | 1.54 | 55.9 | −4.33 | 0.0000 |
| S16 | Aspheric | 4.2045 | 0.3000 | | | | −1.0000 |
| S17 | Spherical | Infinite | 0.2100 | 1.52 | 64.2 | | |
| S18 | Spherical | Infinite | 0.5808 | | | | |
| S19 | Spherical | Infinite | | | | | |

In Example 3, the object-side surface and the image-side surface of any one of the first lens E1 to the eighth lens E8 are aspheric. Table 6 below shows high-order coefficients A4, A6, A8, A10, A12, A14, A16, A18, A20, A22, A24, A26, A28 and A30 applicable to each aspheric surface S1 to S16 in Example 3.

TABLE 6

| Surface number | A4 | A6 | A8 | A10 | A12 | A14 | A16 |
|---|---|---|---|---|---|---|---|
| S1 | −3.5933E−03 | 7.8560E−04 | −1.9152E−03 | 1.4004E−03 | −6.2370E−04 | 1.4136E−04 | −1.3285E−05 |
| S2 | 7.6946E−03 | −1.9602E−02 | 2.4071E−02 | −2.1506E−02 | 1.3623E−02 | −5.8053E−03 | 1.5797E−03 |
| S3 | 1.2535E−02 | −2.4880E−02 | 2.8790E−02 | −2.5515E−02 | 1.6175E−02 | −6.9199E−03 | 1.8895E−03 |
| S4 | 9.0542E−04 | −4.0928E−02 | 5.2674E−02 | −3.6120E−02 | 1.4889E−02 | −3.7690E−03 | 5.7967E−04 |
| S5 | 4.7103E−04 | −4.3526E−02 | 7.0676E−02 | −5.6788E−02 | 2.8044E−02 | −8.9146E−03 | 1.8158E−03 |
| S6 | 6.2763E−03 | −1.8242E−02 | 3.0920E−02 | −2.2907E−02 | 7.3430E−03 | 7.2138E−04 | −1.3738E−03 |
| S7 | −8.1111E−03 | −7.0185E−03 | −5.3729E−03 | 1.9239E−02 | −2.3935E−02 | 1.6819E−02 | −6.8931E−03 |
| S8 | −1.0236E−02 | −5.3761E−04 | −1.0967E−02 | 1.9776E−02 | −1.9025E−02 | 1.1450E−02 | −4.2303E−03 |
| S9 | −1.8900E−02 | 2.8565E−03 | −6.4025E−03 | 3.0335E−03 | −8.1475E−04 | 4.0560E−04 | −3.7758E−04 |
| S10 | −2.5730E−02 | 9.0709E−03 | −1.2963E−02 | 1.2391E−02 | −8.6829E−03 | 4.0048E−03 | −1.1362E−03 |
| S11 | −4.3165E−02 | 1.0265E−02 | −2.4863E−03 | 5.8454E−04 | −3.0228E−04 | 1.0874E−04 | −2.1159E−05 |
| S12 | −1.9984E−02 | −2.1928E−03 | 3.3981E−03 | −1.3858E−03 | 2.6224E−04 | −2.1883E−05 | −6.8775E−08 |
| S13 | 1.2277E−02 | −8.7361E−03 | 2.3986E−03 | −5.2361E−04 | 6.8329E−05 | −5.9156E−06 | 4.3289E−07 |
| S14 | 3.6300E−02 | −7.7634E−03 | 1.0148E−03 | −1.5566E−04 | 1.4875E−05 | −2.1749E−08 | −1.0319E−07 |
| S15 | −1.2831E−02 | −2.2499E−03 | 2.8339E−03 | −1.1493E−03 | 2.9053E−04 | −4.8796E−05 | 5.6450E−06 |
| S16 | −3.5518E−02 | 8.1971E−03 | −2.0292E−03 | 4.6990E−04 | −9.1188E−05 | 1.3604E−05 | −1.4991E−06 |

| Surface number | A18 | A20 | A22 | A24 | A26 | A28 | A30 |
|---|---|---|---|---|---|---|---|
| S1 | −1.7401E−08 | −3.8214E−09 | 0.0000E+00 | 0.0000E+00 | 0.0000E+00 | 0.0000E+00 | 0.0000E+00 |
| S2 | −2.4584E−04 | 1.6429E−05 | 0.0000E+00 | 0.0000E+00 | 0.0000E+00 | 0.0000E+00 | 0.0000E+00 |
| S3 | −2.9507E−04 | 1.9877E−05 | 0.0000E+00 | 0.0000E+00 | 0.0000E+00 | 0.0000E+00 | 0.0000E+00 |
| S4 | −5.1924E−05 | 2.2516E−06 | 0.0000E+00 | 0.0000E+00 | 0.0000E+00 | 0.0000E+00 | 0.0000E+00 |
| S5 | −2.1702E−04 | 1.1165E−05 | 0.0000E+00 | 0.0000E+00 | 0.0000E+00 | 0.0000E+00 | 0.0000E+00 |
| S6 | 4.2021E−04 | −4.1938E−05 | 0.0000E+00 | 0.0000E+00 | 0.0000E+00 | 0.0000E+00 | 0.0000E+00 |

TABLE 6-continued

| | | | | | | | |
|---|---|---|---|---|---|---|---|
| S7 | 1.5529E−03 | −1.4674E−04 | 0.0000E+00 | 0.0000E+00 | 0.0000E+00 | 0.0000E+00 | 0.0000E+00 |
| S8 | 8.9981E−04 | −8.4152E−05 | 0.0000E+00 | 0.0000E+00 | 0.0000E+00 | 0.0000E+00 | 0.0000E+00 |
| S9 | 1.5619E−04 | −2.0336E−05 | 0.0000E+00 | 0.0000E+00 | 0.0000E+00 | 0.0000E+00 | 0.0000E+00 |
| S10 | 1.7928E−04 | −1.1919E−05 | 0.0000E+00 | 0.0000E+00 | 0.0000E+00 | 0.0000E+00 | 0.0000E+00 |
| S11 | 2.1114E−06 | −8.4321E−08 | 0.0000E+00 | 0.0000E+00 | 0.0000E+00 | 0.0000E+00 | 0.0000E+00 |
| S12 | 1.3430E−07 | −6.4004E−09 | 0.0000E+00 | 0.0000E+00 | 0.0000E+00 | 0.0000E+00 | 0.0000E+00 |
| S13 | −2.3488E−08 | 5.7223E−10 | 0.0000E+00 | 0.0000E+00 | 0.0000E+00 | 0.0000E+00 | 0.0000E+00 |
| S14 | 6.9883E−09 | −1.4640E−10 | 0.0000E+00 | 0.0000E+00 | 0.0000E+00 | 0.0000E+00 | 0.0000E+00 |
| S15 | −4.6123E−07 | 2.6927E−08 | −1.1195E−09 | 3.2446E−11 | −6.2402E−13 | 7.1675E−15 | −3.7251E−17 |
| S16 | 1.2020E−07 | −6.9470E−09 | 2.8527E−10 | −8.0991E−12 | 1.5089E−13 | −1.6581E−15 | 8.1389E−18 |

Figures 6A, 6B:
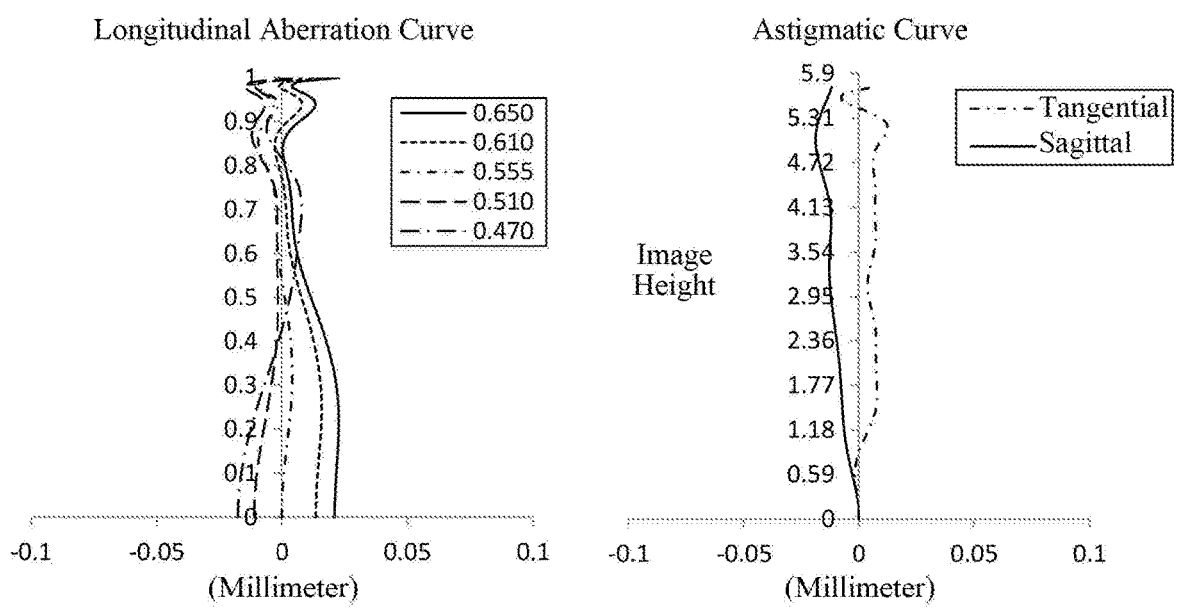

FIG. 6A illustrates a longitudinal aberration curve of the optical imaging lens assembly according to Example 3, representing deviations of focal points converged by light of different wavelengths after passing through the lens assembly. FIG. 6B illustrates an astigmatic curve of the optical imaging lens assembly according to Example 3, representing a curvature of a tangential plane and a curvature of a sagittal plane. FIG. 6C illustrates a distortion curve of the optical imaging lens assembly according to Example 3, representing amounts of distortion corresponding to different image heights. FIG. 6D illustrates a lateral color curve of the optical imaging lens assembly according to Example 3, representing deviations of different image heights on an imaging plane after light passes through the lens assembly. It can be seen from FIG. 6A to FIG. 6D that the optical imaging lens assembly provided in Example 3 may achieve good image quality.

Example 4

An optical imaging lens assembly according to Example 4 of the present disclosure is described below with reference to FIG. 7 to FIG. 8D. FIG. 7 shows a schematic structural view of the optical imaging lens assembly according to Example 4 of the present disclosure.

As shown in FIG. 7, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S to S18 and is finally imaged on the imaging plane S19.

In this example, a total effective focal length f of the optical imaging lens assembly satisfies f=6.62 mm, a distance TTL along the optical axis from the object-side surface Sb of the first lens E1 to an imaging plane S19 of the optical imaging lens assembly satisfies TTL=7.80 mm, half of a diagonal length ImgH of an effective pixel area on the imaging plane S19 of the optical imaging lens assembly satisfies ImgH=6.00 mm, and half of a maximal field-of-view Semi-FOV of the optical imaging lens assembly satisfies Semi-FOV=42.1°.

Table 7 is a table illustrating the basic parameters of the optical imaging lens assembly of Example 4, wherein the units of the radius of curvature, the thickness/distance and the focal length are all in millimeter (mm).

TABLE 7

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.7686 | | | | |
| S1 | Aspheric | 2.6941 | 0.7570 | 1.55 | 56.1 | 7.81 | 0.4257 |
| S2 | Aspheric | 6.5898 | 0.0605 | | | | 0.0000 |
| S3 | Aspheric | 6.4339 | 0.4213 | 1.55 | 56.1 | 22.99 | 0.0000 |
| S4 | Aspheric | 12.8959 | 0.0763 | | | | 4.1183 |
| S5 | Aspheric | 13.8586 | 0.2400 | 1.67 | 19.2 | −15.17 | 54.9560 |
| S6 | Aspheric | 5.8611 | 0.3241 | | | | 4.7141 |
| S7 | Aspheric | 13.8296 | 0.2693 | 1.65 | 23.5 | −89.82 | −5.7520 |
| S8 | Aspheric | 11.0743 | 0.2808 | | | | 4.9916 |
| S9 | Aspheric | −58.6164 | 0.5999 | 1.55 | 56.1 | 47.25 | −99.0000 |
| S10 | Aspheric | −17.9785 | 0.5851 | | | | 0.0000 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S11 | Aspheric | 4.3688 | 0.3950 | 1.67 | 20.4 | 76.48 | 0.0000 |
| S12 | Aspheric | 4.6062 | 0.6277 | | | | −13.0233 |
| S13 | Aspheric | 11.4929 | 0.5501 | 1.55 | 56.1 | 7.29 | 0.0000 |
| S14 | Aspheric | −5.9832 | 0.9292 | | | | 0.0000 |
| S15 | Aspheric | −5.4168 | 0.5945 | 1.54 | 55.9 | −4.25 | 0.0000 |
| S16 | Aspheric | 4.0963 | 0.2995 | | | | −1.0000 |
| S17 | Spherical | Infinite | 0.2100 | 1.52 | 64.2 | | |
| S18 | Spherical | Infinite | 0.5796 | | | | |
| S19 | Spherical | Infinite | | | | | |

In Example 4, the object-side surface and the image-side surface of any one of the first lens E1 to the eighth lens E8 are aspheric. Table 8 below shows high-order coefficients A4, A6, A8, A10, A12, A14, A16, A18, A20, A22, A24, A26, A28 and A30 applicable to each aspheric surface S1 to S16 in Example 4.

TABLE 8

| Surface number | A4 | A6 | A8 | A10 | A12 | A14 | A16 |
|---|---|---|---|---|---|---|---|
| S1 | −3.6604E−03 | 3.0183E−04 | −1.4356E−03 | 9.6873E−04 | −3.6849E−04 | 4.9481E−05 | 4.4624E−06 |
| S2 | 8.1664E−03 | −2.0094E−02 | 2.3669E−02 | −2.1424E−02 | 1.4028E−02 | −6.1401E−03 | 1.7046E−03 |
| S3 | 1.2595E−02 | −2.2078E−02 | 2.0735E−02 | −1.5802E−02 | 9.0965E−03 | −3.6272E−03 | 9.5315E−04 |
| S4 | −3.6504E−04 | −3.1345E−02 | 4.1012E−02 | −3.1658E−02 | 1.6264E−02 | −5.6487E−03 | 1.2786E−03 |
| S5 | −4.9691E−03 | −2.6160E−02 | 4.6119E−02 | −3.7400E−02 | 1.8656E−02 | −5.9654E−03 | 1.1839E−03 |
| S6 | 3.1844E−03 | −1.3832E−02 | 3.2895E−02 | −3.5439E−02 | 2.4285E−02 | −1.0870E−02 | 3.0121E−03 |
| S7 | −9.9905E−03 | 3.4376E−03 | −3.3019E−02 | 6.2492E−02 | −6.7093E−02 | 4.4093E−02 | −1.7429E−02 |
| S8 | −1.0528E−02 | 5.2659E−03 | −2.3556E−02 | 3.4922E−02 | −3.1110E−02 | 1.7752E−02 | −6.3027E−03 |
| S9 | −2.1303E−02 | 9.4499E−03 | −1.7136E−02 | 1.5823E−02 | −1.1031E−02 | 5.6484E−03 | −2.0185E−03 |
| S10 | −3.0790E−02 | 1.1797E−02 | −1.2405E−02 | 9.5062E−03 | −5.7672E−03 | 2.4540E−03 | −6.6697E−04 |
| S11 | −3.9015E−02 | 6.5544E−03 | −4.2238E−04 | −2.7672E−04 | −5.4418E−05 | 6.2930E−05 | −1.5819E−05 |
| S12 | −1.8305E−02 | −3.4683E−03 | 4.6021E−03 | −2.0595E−03 | 4.7551E−04 | −6.1028E−05 | 4.0649E−06 |
| S13 | 1.4989E−02 | −9.7268E−03 | 2.8517E−03 | −7.1434E−04 | −1.6465E−05 | 1.5200E−06 | |
| S14 | 3.6117E−02 | −8.2058E−03 | 9.9689E−04 | −7.6155E−05 | −8.0171E−06 | 3.0425E−06 | −3.2460E−07 |
| S15 | −1.6386E−02 | 3.9864E−04 | 1.8986E−03 | −9.8842E−04 | 2.8891E−04 | −5.3791E−05 | 6.7520E−06 |
| S16 | −4.0542E−02 | 1.1643E−02 | −3.5523E−03 | 9.4082E−04 | −1.9535E−04 | 3.0285E−05 | −3.4477E−06 |

| Surface number | A18 | A20 | A22 | A24 | A26 | A28 | A30 |
|---|---|---|---|---|---|---|---|
| S1 | −1.2053E−06 | −5.4558E−08 | 0.0000E+00 | 0.0000E+00 | 0.0000E+00 | 0.0000E+00 | 0.0000E+00 |
| S2 | −2.6936E−04 | 1.8187E−05 | 0.0000E+00 | 0.0000E+00 | 0.0000E+00 | 0.0000E+00 | 0.0000E+00 |
| S3 | −1.4858E−04 | 1.0274E−05 | 0.0000E+00 | 0.0000E+00 | 0.0000E+00 | 0.0000E+00 | 0.0000E+00 |
| S4 | −1.6912E−04 | 9.8021E−06 | 0.0000E+00 | 0.0000E+00 | 0.0000E+00 | 0.0000E+00 | 0.0000E+00 |
| S5 | −1.2427E−04 | 3.8149E−06 | 0.0000E+00 | 0.0000E+00 | 0.0000E+00 | 0.0000E+00 | 0.0000E+00 |
| S6 | −4.4688E−04 | 2.7037E−05 | 0.0000E+00 | 0.0000E+00 | 0.0000E+00 | 0.0000E+00 | 0.0000E+00 |
| S7 | 3.8183E−03 | −3.5398E−04 | 0.0000E+00 | 0.0000E+00 | 0.0000E+00 | 0.0000E+00 | 0.0000E+00 |
| S8 | 1.2881E−03 | −1.1533E−04 | 0.0000E+00 | 0.0000E+00 | 0.0000E+00 | 0.0000E+00 | 0.0000E+00 |
| S9 | 4.3934E−04 | −4.0877E−05 | 0.0000E+00 | 0.0000E+00 | 0.0000E+00 | 0.0000E+00 | 0.0000E+00 |
| S10 | 1.0310E−04 | −6.7844E−06 | 0.0000E+00 | 0.0000E+00 | 0.0000E+00 | 0.0000E+00 | 0.0000E+00 |
| S11 | 1.7385E−06 | −7.2214E−08 | 0.0000E+00 | 0.0000E+00 | 0.0000E+00 | 0.0000E+00 | 0.0000E+00 |
| S12 | −9.9365E−08 | −8.9948E−10 | 0.0000E+00 | 0.0000E+00 | 0.0000E+00 | 0.0000E+00 | 0.0000E+00 |
| S13 | −8.1082E−08 | 1.7945E−09 | 0.0000E+00 | 0.0000E+00 | 0.0000E+00 | 0.0000E+00 | 0.0000E+00 |
| S14 | 1.5344E−08 | −2.7569E−10 | 0.0000E+00 | 0.0000E+00 | 0.0000E+00 | 0.0000E+00 | 0.0000E+00 |
| S15 | −5.9146E−07 | 3.6741E−08 | −1.6169E−09 | 4.9394E−11 | −9.9772E−13 | 1.1996E−14 | −6.5043E−17 |
| S16 | 2.8645E−07 | −1.7249E−08 | 7.4232E−10 | −2.2206E−11 | 4.3802E−13 | −5.1180E−15 | 2.6816E−17 |

Figure 8A:
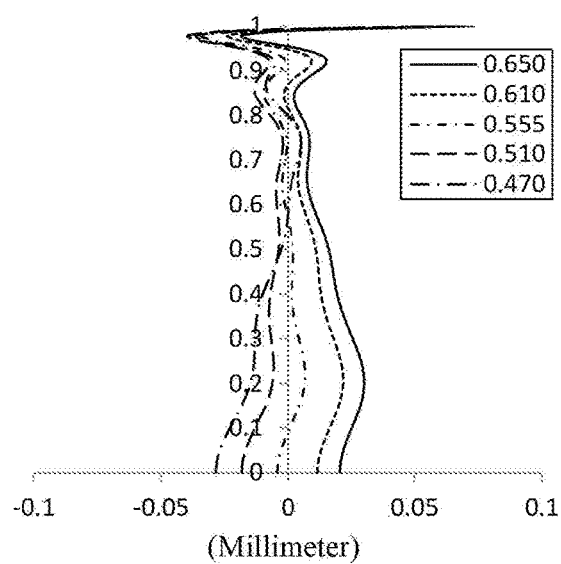
FIGS. 8A to 8D illustrate a longitudinal aberration curve, an astigmatic curve, a distortion curve, and a lateral color curve of the optical imaging lens assembly of the example 4, respectively.
Figure 8B:
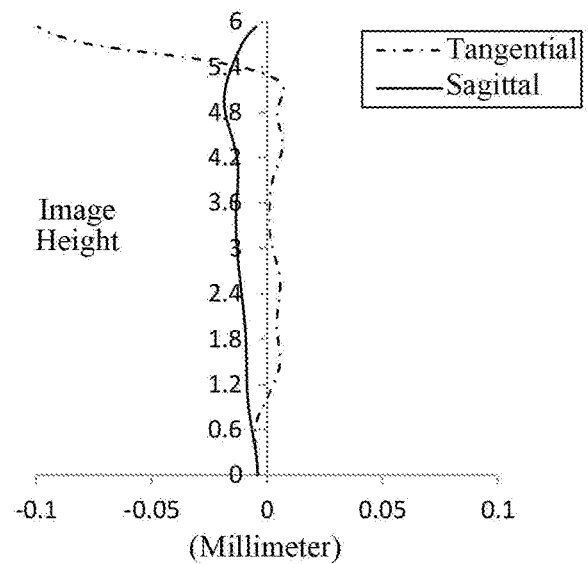
Figure 8C:
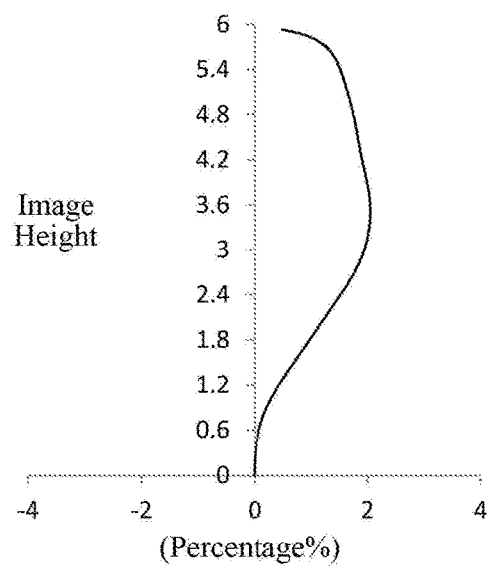
Figure 8D:
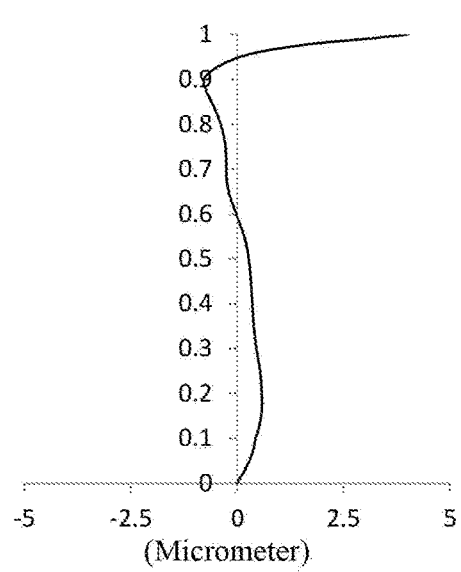

FIG. 8A illustrates a longitudinal aberration curve of the optical imaging lens assembly according to Example 4, representing deviations of focal points converged by light of different wavelengths after passing through the lens assembly. FIG. 8B illustrates an astigmatic curve of the optical imaging lens assembly according to Example 4, representing a curvature of a tangential plane and a curvature of a sagittal plane. FIG. 8C illustrates a distortion curve of the optical imaging lens assembly according to Example 4, representing amounts of distortion corresponding to different image heights. FIG. 8D illustrates a lateral color curve of the optical imaging lens assembly according to Example 4, representing deviations of different image heights on an imaging plane after light passes through the lens assembly.

It can be seen from FIG. 8A to FIG. 8D that the optical imaging lens assembly provided in Example 4 may achieve good image quality.

Example 5

An optical imaging lens assembly according to Example 5 of the present disclosure is described below with reference to FIG. 9 to FIG. 10D. FIG. 9 shows a schematic structural view of the optical imaging lens assembly according to Example 5 of the present disclosure.

As shown in FIG. 9, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has negative refractive power, an object-side surface S9 thereof is a concave surface, and an image-side surface S10 thereof is a convex surface. The sixth lens E6 has positive refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S to S18 and is finally imaged on the imaging plane S19.

In this example, a total effective focal length f of the optical imaging lens assembly satisfies f=6.64 mm, a distance TTL along the optical axis from the object-side surface S1 of the first lens E1 to an imaging plane S19 of the optical imaging lens assembly satisfies TTL=7.80 mm, half of a diagonal length ImgH of an effective pixel area on the imaging plane S19 of the optical imaging lens assembly satisfies ImgH=5.86 mm, and half of a maximal field-of-view Semi-FOV of the optical imaging lens assembly satisfies Semi-FOV=41.0°.

Table 9 is a table illustrating the basic parameters of the optical imaging lens assembly of Example 5, wherein the units of the radius of curvature, the thickness/distance and the focal length are all in millimeter (mm).

TABLE 9

| Surface number | Surface type | Radius of curvature | Thickness/ Distance | Refractive index | Abbe number | Focal length | Conic coefficient |
|---|---|---|---|---|---|---|---|
| OBJ | Spherical | Infinite | Infinite | | | | |
| STO | Spherical | Infinite | −0.7662 | | | | |
| S1 | Aspheric | 2.6696 | 0.7373 | 1.55 | 56.1 | 7.94 | 0.3527 |
| S2 | Aspheric | 6.2688 | 0.0897 | | | | 0.0000 |
| S3 | Aspheric | 6.0809 | 0.4559 | 1.55 | 56.1 | 20.14 | 0.0000 |
| S4 | Aspheric | 13.2429 | 0.0651 | | | | 2.5686 |
| S5 | Aspheric | 15.0497 | 0.2400 | 1.67 | 19.2 | −12.49 | 62.3429 |
| S6 | Aspheric | 5.3832 | 0.2545 | | | | 1.0767 |
| S7 | Aspheric | 7.8522 | 0.3138 | 1.65 | 23.5 | 47.92 | 0.8793 |
| S8 | Aspheric | 10.3699 | 0.4996 | | | | 11.3785 |
| S9 | Aspheric | −21.7664 | 0.5506 | 1.55 | 56.1 | −90.61 | 25.4305 |
| S10 | Aspheric | −39.2174 | 0.4401 | | | | 0.0000 |
| S11 | Aspheric | 4.1782 | 0.4440 | 1.67 | 20.4 | 85.39 | 0.0000 |
| S12 | Aspheric | 4.3181 | 0.5487 | | | | −16.7945 |
| S13 | Aspheric | 9.8751 | 0.6146 | 1.55 | 56.1 | 6.81 | 0.0000 |
| S14 | Aspheric | −5.8292 | 0.9063 | | | | 0.0000 |
| S15 | Aspheric | −5.4607 | 0.5686 | 1.54 | 55.9 | −4.30 | 0.0000 |
| S16 | Aspheric | 4.1465 | 0.2906 | | | | −1.0000 |
| S17 | Spherical | Infinite | 0.2100 | 1.52 | 64.2 | | |
| S18 | Spherical | Infinite | 0.5707 | | | | |
| S19 | Spherical | Infinite | | | | | |

In Example 5, the object-side surface and the image-side surface of any one of the first lens E1 to the eighth lens E8 are aspheric. Table 10 below shows high-order coefficients A4, A6, A8, A10, A12, A14, A16, A18, A20, A22, A24, A26, A28 and A30 applicable to each aspheric surface S1 to S16 in Example 5.

TABLE 10

| Surface number | A4 | A6 | A8 | A10 | A12 | A14 | A16 |
|---|---|---|---|---|---|---|---|
| S1 | −3.2878E−03 | 5.6168E−04 | −1.7265E−03 | 1.3170E−03 | −6.4062E−04 | 1.7120E−04 | −2.4452E−05 |
| S2 | 4.9020E−03 | −9.4183E−03 | 1.0704E−02 | −1.0763E−02 | 7.9573E−03 | −3.8014E−03 | 1.1034E−03 |
| S3 | 7.3630E−03 | −1.0171E−02 | 5.7187E−03 | −2.8786E−03 | 1.7515E−03 | −9.4033E−04 | 3.2328E−04 |
| S4 | −5.8422E−03 | −2.1854E−02 | 2.7199E−02 | −1.5920E−02 | 4.2427E−03 | 6.8278E−05 | −3.3762E−04 |
| S5 | −1.0234E−02 | −1.5137E−02 | 3.5045E−02 | −2.9303E−02 | 1.3558E−02 | −3.5648E−03 | 4.8731E−04 |
| S6 | −1.9291E−03 | −2.2917E−03 | 1.5791E−02 | −1.5114E−02 | 5.3825E−03 | 1.0422E−03 | −1.5991E−03 |

TABLE 10-continued

| | | | | | | |
|---|---|---|---|---|---|---|
| S7 | −1.1746E−02 | 4.1227E−03 | −2.7150E−02 | 5.1298E−02 | −5.6648E−02 | 3.8022E−02 | −1.5188E−02 |
| S8 | −8.9248E−03 | 1.4330E−03 | −9.1200E−03 | 1.1819E−02 | −8.6856E−03 | 3.7907E−03 | −8.4706E−04 |
| S9 | −2.2234E−02 | 1.4127E−02 | −2.9409E−02 | 3.6563E−02 | −3.1339E−02 | 1.7499E−02 | −6.0612E−03 |
| S10 | −3.8400E−02 | 1.7106E−02 | −1.2906E−02 | 7.2503E−03 | −3.6483E−03 | 1.4533E−03 | −3.9064E−04 |
| S11 | −5.0542E−02 | 1.0966E−02 | −1.1160E−03 | 1.5722E−04 | −4.4606E−04 | 2.1387E−04 | −4.5171E−05 |
| S12 | −1.5624E−02 | −1.0610E−02 | 1.0261E−02 | −4.2196E−03 | 9.5272E−04 | −1.2609E−04 | 9.5771E−06 |
| S13 | 1.9438E−02 | −1.5858E−02 | 5.5371E−03 | −1.3355E−03 | 2.0045E−04 | −1.8947E−05 | 1.1529E−06 |
| S14 | 4.2466E−02 | −1.2822E−02 | 3.1464E−03 | −7.2510E−04 | 1.1360E−04 | −1.0858E−05 | 6.1302E−07 |
| S15 | −1.4615E−02 | −4.1033E−03 | 5.5692E−03 | −2.3631E−03 | 5.8346E−04 | −9.4043E−05 | 1.0456E−05 |
| S16 | −4.0515E−02 | 8.7241E−03 | −1.4409E−03 | 1.8861E−04 | −2.7013E−05 | 4.2554E−06 | −5.4370E−07 |

| Surface number | A18 | A20 | A22 | A24 | A26 | A28 | A30 |
|---|---|---|---|---|---|---|---|
| S1 | 1.5906E−06 | −7.8433E−08 | 0.0000E+00 | 0.0000E+00 | 0.0000E+00 | 0.0000E+00 | 0.0000E+00 |
| S2 | −1.7553E−04 | 1.1604E−05 | 0.0000E+00 | 0.0000E+00 | 0.0000E+00 | 0.0000E+00 | 0.0000E+00 |
| S3 | −5.8370E−05 | 4.1439E−06 | 0.0000E+00 | 0.0000E+00 | 0.0000E+00 | 0.0000E+00 | 0.0000E+00 |
| S4 | 7.9379E−05 | −6.2355E−06 | 0.0000E+00 | 0.0000E+00 | 0.0000E+00 | 0.0000E+00 | 0.0000E+00 |
| S5 | −2.1093E−05 | −1.4881E−06 | 0.0000E+00 | 0.0000E+00 | 0.0000E+00 | 0.0000E+00 | 0.0000E+00 |
| S6 | 5.3892E−04 | −6.2283E−05 | 0.0000E+00 | 0.0000E+00 | 0.0000E+00 | 0.0000E+00 | 0.0000E+00 |
| S7 | 3.3449E−03 | −3.1156E−04 | 0.0000E+00 | 0.0000E+00 | 0.0000E+00 | 0.0000E+00 | 0.0000E+00 |
| S8 | 8.3373E−05 | −2.3319E−06 | 0.0000E+00 | 0.0000E+00 | 0.0000E+00 | 0.0000E+00 | 0.0000E+00 |
| S9 | 1.1868E−03 | −9.9849E−05 | 0.0000E+00 | 0.0000E+00 | 0.0000E+00 | 0.0000E+00 | 0.0000E+00 |
| S10 | 6.1377E−05 | −4.1502E−06 | 0.0000E+00 | 0.0000E+00 | 0.0000E+00 | 0.0000E+00 | 0.0000E+00 |
| S11 | 4.6268E−06 | −1.8638E−07 | 0.0000E+00 | 0.0000E+00 | 0.0000E+00 | 0.0000E+00 | 0.0000E+00 |
| S12 | −3.7191E−07 | 5.2387E−09 | 0.0000E+00 | 0.0000E+00 | 0.0000E+00 | 0.0000E+00 | 0.0000E+00 |
| S13 | −4.2377E−08 | 7.1178E−10 | 0.0000E+00 | 0.0000E+00 | 0.0000E+00 | 0.0000E+00 | 0.0000E+00 |
| S14 | −1.8833E−08 | 2.4232E−10 | 0.0000E+00 | 0.0000E+00 | 0.0000E+00 | 0.0000E+00 | 0.0000E+00 |
| S15 | −8.2615E−07 | 4.6943E−08 | −1.9107E−09 | 5.4485E−11 | −1.0356E−12 | 1.1800E−14 | −6.1055E−17 |
| S16 | 4.8963E−08 | −3.0287E−09 | 1.2782E−10 | −3.6122E−12 | 6.5276E−14 | −6.8020E−16 | 3.0993E−18 |

FIG. 10A illustrates a longitudinal aberration curve of the optical imaging lens assembly according to Example 5, representing deviations of focal points converged by light of different wavelengths after passing through the lens assembly. FIG. 10B illustrates an astigmatic curve of the optical imaging lens assembly according to Example 5, representing a curvature of a tangential plane and a curvature of a sagittal plane. FIG. 10C illustrates a distortion curve of the optical imaging lens assembly according to Example 5, representing amounts of distortion corresponding to different image heights. FIG. 10D illustrates a lateral color curve of the optical imaging lens assembly according to Example 5, representing deviations of different image heights on an imaging plane after light passes through the lens assembly. It can be seen from FIG. 10A to FIG. 10D that the optical imaging lens assembly provided in Example 5 may achieve good image quality.

Example 6

An optical imaging lens assembly according to Example 6 of the present disclosure is described below with reference to FIG. 11 to FIG. 12D. FIG. 11 shows a schematic structural view of the optical imaging lens assembly according to Example 6 of the present disclosure.

As shown in FIG. 11, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S to S18 and is finally imaged on the imaging plane S19.

In this example, a total effective focal length f of the optical imaging lens assembly satisfies f=6.66 mm, a distance TTL along the optical axis from the object-side surface S1 of the first lens E1 to an imaging plane S19 of the optical imaging lens assembly satisfies TTL=7.86 mm, half of a diagonal length ImgH of an effective pixel area on the imaging plane S19 of the optical imaging lens assembly satisfies ImgH=6.02 mm, and half of a maximal field-of-view Semi-FOV of the optical imaging lens assembly satisfies Semi-FOV=41.6°.

Table 11 is a table illustrating the basic parameters of the optical imaging lens assembly of Example 6, wherein the units of the radius of curvature, the thickness/distance and the focal length are all in millimeter (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7244 | | | | |
| S1 | Aspheric | 2.6611 | 0.9077 | 1.55 | 56.1 | 5.56 | 0.1505 |
| S2 | Aspheric | 18.9867 | 0.0500 | | | | 0.0000 |
| S3 | Aspheric | 17.1904 | 0.2334 | 1.55 | 56.1 | −61.17 | 0.0000 |
| S4 | Aspheric | 11.2941 | 0.0510 | | | | −1.4602 |
| S5 | Aspheric | 13.0870 | 0.2800 | 1.67 | 19.2 | −11.67 | 16.7925 |
| S6 | Aspheric | 4.8858 | 0.1824 | | | | 1.4037 |
| S7 | Aspheric | 5.5877 | 0.3409 | 1.65 | 23.5 | 34.75 | −1.2372 |
| S8 | Aspheric | 7.2714 | 0.4973 | | | | 11.4948 |
| S9 | Aspheric | −18.5703 | 0.6327 | 1.55 | 56.1 | 70.13 | 51.3860 |
| S10 | Aspheric | −12.6557 | 0.5644 | | | | 0.0000 |
| S11 | Aspheric | 5.0441 | 0.4650 | 1.67 | 20.4 | −88.49 | 0.0000 |
| S12 | Aspheric | 4.4751 | 0.4159 | | | | −15.8798 |
| S13 | Aspheric | 11.3200 | 0.7261 | 1.55 | 56.1 | 6.64 | 0.0000 |
| S14 | Aspheric | −5.2149 | 0.7847 | | | | 0.0000 |
| S15 | Aspheric | −6.2759 | 0.6297 | 1.54 | 55.9 | −4.33 | 0.0000 |
| S16 | Aspheric | 3.8185 | 0.3044 | | | | −1.0000 |
| S17 | Spherical | Infinite | 0.2100 | 1.52 | 64.2 | | |
| S18 | Spherical | Infinite | 0.5846 | | | | |
| S19 | Spherical | Infinite | | | | | |

In Example 6, the object-side surface and the image-side surface of any one of the first lens E1 to the eighth lens E8 are aspheric. Table 12 below shows high-order coefficients A4, A6, A8, A10, A12, A14, A16, A18 and A20 applicable to each aspheric surface S1 to S16 in Example 6.

Figure 12A:
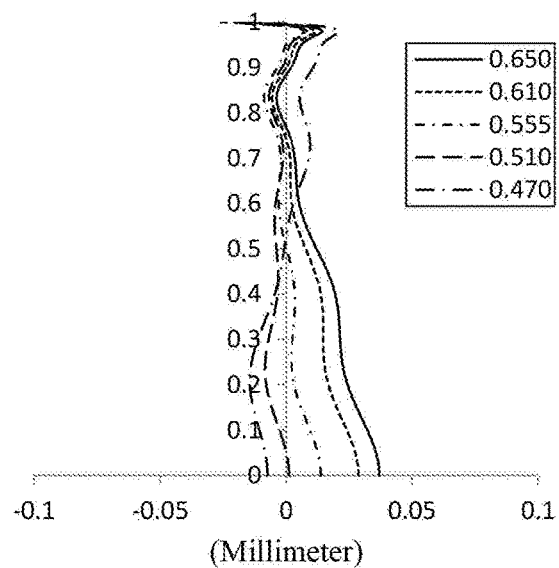
FIGS. 12A to 12D illustrate a longitudinal aberration curve, an astigmatic curve, a distortion curve, and a lateral color curve of the optical imaging lens assembly of the example 6, respectively.
Figure 12B:
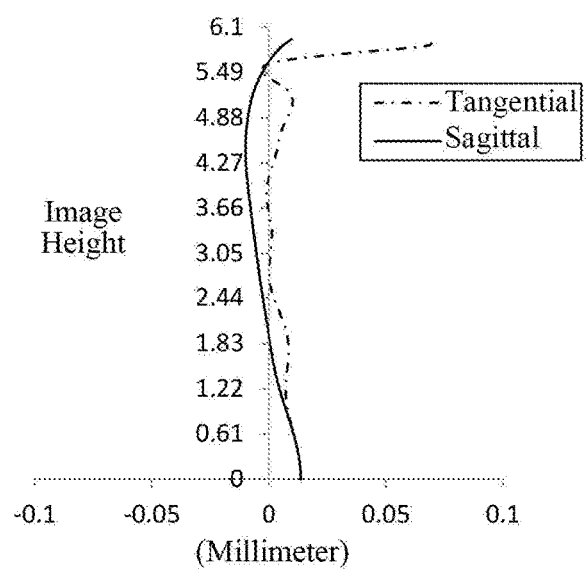

FIG. 12A illustrates a longitudinal aberration curve of the optical imaging lens assembly according to Example 6, representing deviations of focal points converged by light of different wavelengths after passing through the lens assembly. FIG. 12B illustrates an astigmatic curve of the optical

TABLE 12

| Surface number | A4 | A6 | A8 | A10 | A12 |
|---|---|---|---|---|---|
| S1 | −1.5427E−03 | −1.0518E−03 | 7.5507E−04 | −4.0269E−04 | −2.9619E−05 |
| S2 | −4.9928E−03 | 1.4852E−02 | −2.2292E−02 | 1.9360E−02 | −1.0330E−02 |
| S3 | −3.7808E−03 | 1.9992E−02 | −3.4799E−02 | 3.1753E−02 | −1.7183E−02 |
| S4 | −1.9064E−02 | 3.1355E−02 | −7.2328E−02 | 8.6414E−02 | −5.9030E−02 |
| S5 | −1.6887E−02 | 2.9420E−02 | −5.5938E−02 | 6.8430E−02 | −4.9058E−02 |
| S6 | −7.5857E−03 | 1.9006E−02 | −2.9515E−02 | 3.7350E−02 | −3.1492E−02 |
| S7 | −1.5087E−02 | 1.1923E−03 | −7.9116E−04 | −1.4134E−03 | 1.2554E−03 |
| S8 | −1.2377E−02 | 2.1703E−03 | −7.0602E−03 | 9.0900E−03 | −7.3310E−03 |
| S9 | −1.7420E−02 | 4.9608E−03 | −1.6739E−02 | 2.6427E−02 | −2.8050E−02 |
| S10 | −2.7698E−02 | 9.6764E−03 | −1.2804E−02 | 1.2079E−02 | −8.2103E−03 |
| S11 | −3.7218E−02 | 3.3705E−03 | 2.4319E−03 | −1.6607E−03 | 4.2383E−04 |
| S12 | −8.7748E−03 | −1.2505E−02 | 8.9720E−03 | −3.3414E−03 | 7.5754E−04 |
| S13 | 2.2699E−02 | −1.5504E−02 | 4.1926E−03 | −8.4527E−04 | 1.1628E−04 |
| S14 | 4.4036E−02 | −1.0194E−02 | 6.1446E−03 | 1.7733E−03 | −5.8166E−05 |
| S15 | −1.3930E−02 | −8.3354E−04 | 8.0414E−04 | −1.2285E−04 | 9.8274E−06 |
| S16 | −3.8646E−02 | 7.4231E−03 | −1.2114E−03 | 1.3972E−04 | −1.0716E−05 |

Figure 12C:
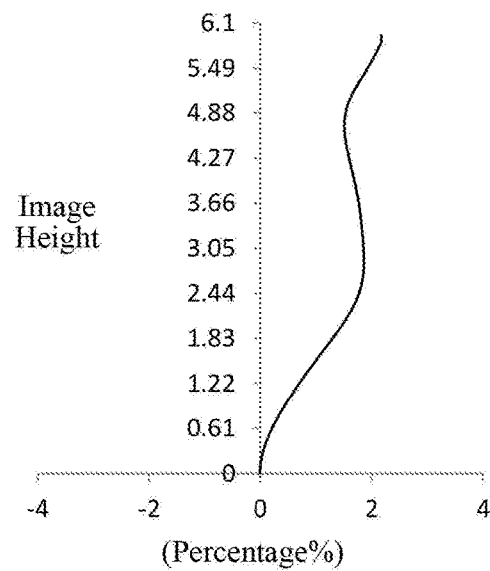
Figure 12D:
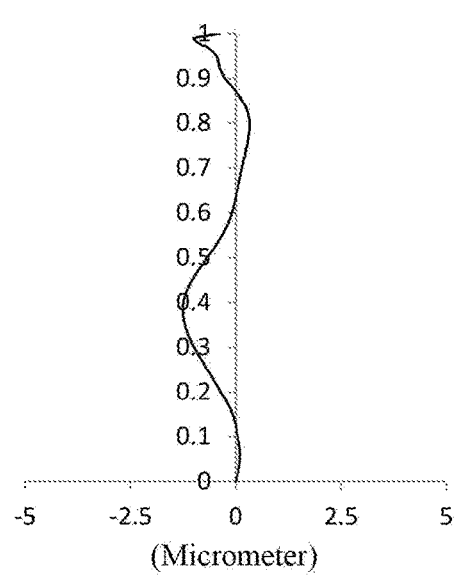

| Surface number | A14 | A16 | A18 | A20 |
|---|---|---|---|---|
| S1 | 8.2911E−05 | −2.8787E−05 | 3.3586E−06 | −8.4042E−08 |
| S2 | 3.4126E−03 | −6.8069E−04 | 7.4997E−05 | −3.4952E−06 |
| S3 | 5.6998E−03 | −1.1363E−03 | 1.2595E−04 | −6.0941E−06 |
| S4 | 2.4351E−02 | −6.0186E−03 | 8.2175E−04 | −4.7759E−05 |
| S5 | 2.1178E−02 | −5.4183E−03 | 7.5515E−04 | −4.4015E−05 |
| S6 | 1.6799E−02 | −5.5318E−03 | 1.0524E−03 | −8.7680E−05 |
| S7 | 3.8067E−05 | −4.5135E−04 | 2.3812E−04 | −3.7996E−05 |
| S8 | 3.8543E−03 | −1.2257E−03 | 2.4711E−04 | −2.5929E−05 |
| S9 | 1.8652E−02 | −7.4894E−03 | 1.6597E−03 | −1.5432E−04 |
| S10 | 3.6258E−03 | −9.8370E−04 | 1.4899E−04 | −9.5548E−06 |
| S11 | −5.1809E−05 | 1.3151E−06 | 3.3390E−07 | −2.3969E−08 |
| S12 | −1.0953E−04 | 9.8975E−06 | −5.0868E−07 | 1.1330E−08 |
| S13 | −1.1480E−05 | 8.7087E−07 | −4.3677E−08 | 9.7831E−10 |
| S14 | 8.2906E−06 | −6.4117E−07 | 2.5901E−08 | −4.2851E−10 |
| S15 | −4.7432E−07 | 1.3941E−08 | −2.3081E−10 | 1.6541E−12 |
| S16 | 5.2744E−07 | −1.5870E−08 | 2.6486E−10 | −1.8788E−12 | imaging lens assembly according to Example 6, representing a curvature of a tangential plane and a curvature of a sagittal plane. FIG. 12C illustrates a distortion curve of the optical imaging lens assembly according to Example 6, representing amounts of distortion corresponding to different image heights. FIG. 12D illustrates a lateral color curve of the optical imaging lens assembly according to Example 6, representing deviations of different image heights on an imaging plane after light passes through the lens assembly. It can be seen from FIG. 12A to FIG. 12D that the optical imaging lens assembly provided in Example 6 may achieve good image quality.

Example 7

Figure 13:
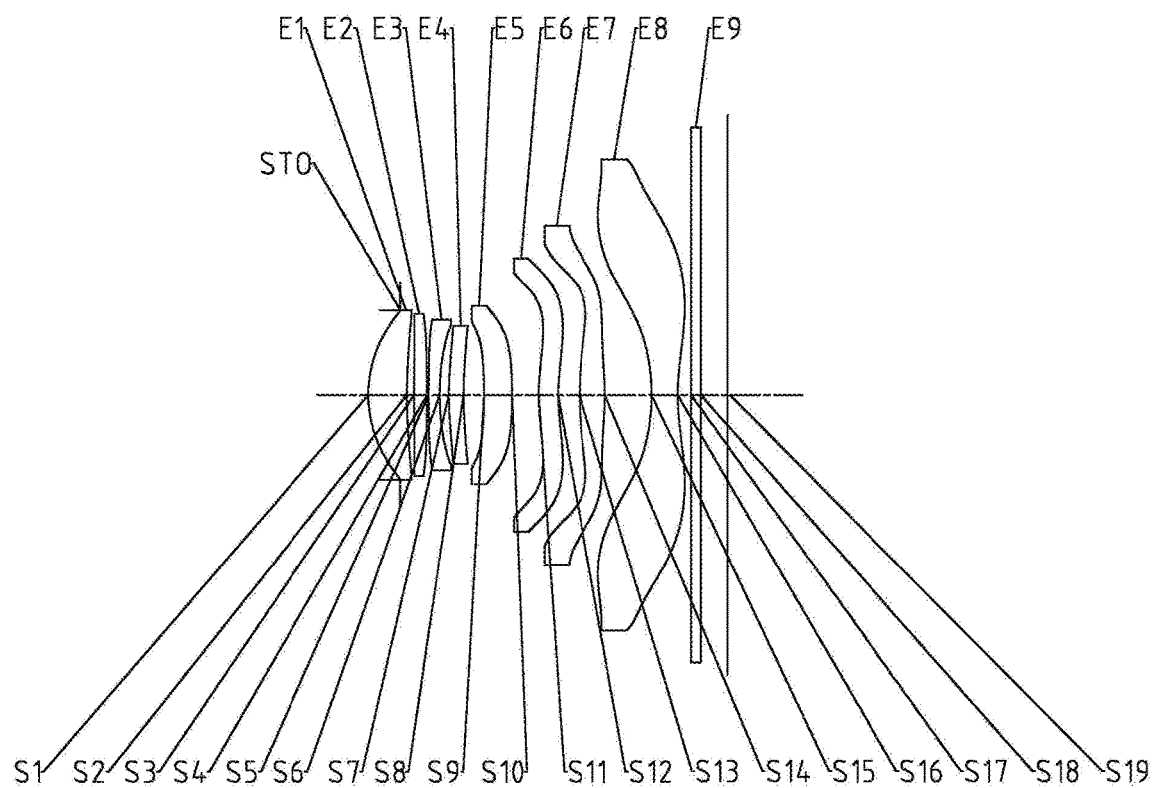
FIG. 13 illustrates a schematic structural view of an optical imaging lens assembly according to example 7 of the present disclosure.

An optical imaging lens assembly according to Example 7 of the present disclosure is described below with reference to FIG. 13 to FIG. 14D. FIG. 13 shows a schematic structural view of the optical imaging lens assembly according to Example 7 of the present disclosure.

As shown in FIG. 13, the optical imaging lens assembly according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has positive refractive power, an object-side surface S3 thereof is a convex surface, and an image-side surface S4 thereof is a convex surface. The third lens E3 has negative refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a concave surface. The fifth lens E5 has positive refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S to S18 and is finally imaged on the imaging plane S19.

In this example, a total effective focal length f of the optical imaging lens assembly satisfies f=6.62 mm, a distance TTL along the optical axis from the object-side surface S1 of the first lens E1 to an imaging plane S19 of the optical imaging lens assembly satisfies TTL=7.80 mm, half of a diagonal length ImgH of an effective pixel area on the imaging plane S19 of the optical imaging lens assembly satisfies ImgH=5.96 mm, and half of a maximal field-of-view Semi-FOV of the optical imaging lens assembly satisfies Semi-FOV=41.8°.

Table 13 is a table illustrating the basic parameters of the optical imaging lens assembly of Example 7, wherein the units of the radius of curvature, the thickness/distance and the focal length are all in millimeter (mm).

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.6920 | | | | |
| S1 | Aspheric | 2.6861 | 0.8373 | 1.55 | 56.1 | 6.00 | 0.4287 |
| S2 | Aspheric | 13.2574 | 0.1572 | | | | 0.0000 |
| S3 | Aspheric | 94.5281 | 0.2817 | 1.55 | 56.1 | 77.36 | 0.0000 |
| S4 | Aspheric | −76.2600 | 0.0317 | | | | 29.0660 |
| S5 | Aspheric | 22.8009 | 0.2400 | 1.67 | 19.2 | −10.53 | 89.4773 |
| S6 | Aspheric | 5.4125 | 0.1984 | | | | −0.1974 |
| S7 | Aspheric | 6.8499 | 0.3208 | 1.65 | 23.5 | 44.16 | 1.7263 |
| S8 | Aspheric | 8.8603 | 0.4414 | | | | 10.0682 |
| S9 | Aspheric | −15.2381 | 0.6135 | 1.55 | 56.1 | 76.84 | 43.7714 |
| S10 | Aspheric | −11.3369 | 0.5761 | | | | 0.0000 |
| S11 | Aspheric | 4.6538 | 0.4228 | 1.67 | 20.4 | −157.01 | 0.0000 |
| S12 | Aspheric | 4.2937 | 0.4678 | | | | −18.0637 |
| S13 | Aspheric | 9.8803 | 0.5525 | 1.55 | 56.1 | 6.96 | 0.0000 |
| S14 | Aspheric | −6.0535 | 1.0153 | | | | 0.0000 |
| S15 | Aspheric | −4.9266 | 0.5659 | 1.54 | 55.9 | −4.37 | −1.0000 |
| S16 | Aspheric | 4.6540 | 0.2937 | | | | −1.0000 |
| S17 | Spherical | Infinite | 0.2100 | 1.52 | 64.2 | | |
| S18 | Spherical | Infinite | 0.5738 | | | | |
| S19 | Spherical | Infinite | | | | | |

In Example 7, the object-side surface and the image-side surface of any one of the first lens E1 to the eighth lens E8 are aspheric. Table 14 below shows high-order coefficients A4, A6, A8, A10, A12, A14, A16, A18 and A20 applicable to each aspheric surface S1 to S16 in Example 7.

TABLE 14

| Surface number | A4 | A6 | A8 | A10 | A12 |
|---|---|---|---|---|---|
| S1 | −3.7236E−03 | 5.4348E−04 | −2.3658E−03 | 2.9081E−03 | −2.3150E−03 |
| S2 | 4.6858E−04 | −1.5453E−03 | 1.6871E−03 | −3.4972E−03 | 3.8465E−03 |
| S3 | 1.0484E−02 | −9.0057E−03 | −1.2351E−03 | 3.9259E−03 | −1.6690E−03 |
| S4 | −1.1558E−03 | −1.5979E−02 | 2.0017E−02 | −1.2584E−02 | 3.7745E−03 |
| S5 | −1.7478E−02 | 4.3139E−03 | 2.0411E−02 | −2.3523E−02 | 1.2620E−02 |
| S6 | −8.7988E−03 | 6.7215E−03 | 1.3195E−02 | −2.4342E−02 | 2.1329E−02 |
| S7 | −1.1532E−02 | −6.2862E−03 | −1.8402E−03 | 1.3957E−02 | −2.2050E−02 |
| S8 | −8.6304E−03 | −2.6508E−03 | −6.3541E−03 | 1.4590E−02 | −1.6803E−02 |
| S9 | −2.0640E−02 | 1.0306E−02 | −3.0938E−02 | 4.5468E−02 | −4.4869E−02 |
| S10 | −3.1207E−02 | 1.0779E−02 | −1.3108E−02 | 1.0532E−02 | −6.4699E−03 |
| S11 | −4.7825E−02 | 1.5102E−02 | −6.6752E−03 | 3.0380E−03 | −1.2280E−03 |
| S12 | −1.8934E−02 | −3.2943E−03 | 3.8885E−03 | −1.4463E−03 | 2.4894E−04 |
| S13 | 1.7494E−02 | −1.1911E−02 | 3.1798E−03 | −7.7501E−04 | 1.4626E−04 |
| S14 | 4.2523E−02 | −8.0504E−03 | −4.4237E−03 | 4.4067E−04 | −9.7953E−05 |
| S15 | −6.6942E−03 | −2.6676E−03 | 1.1652E−03 | −1.7248E−04 | 1.4189E−05 |
| S16 | −2.6740E−02 | 3.6205E−03 | −4.0087E−04 | 3.0717E−05 | −1.4765E−06 |

| Surface number | A14 | A16 | A18 | A20 |
|---|---|---|---|---|
| S1 | 1.0974E−03 | −3.0662E−04 | 4.6063E−05 | −2.9186E−06 |
| S2 | −2.2869E−03 | 7.6218E−04 | −1.3539E−04 | 1.0111E−05 |
| S3 | −3.2847E−05 | 2.3552E−04 | −6.9439E−05 | 6.6797E−06 |
| S4 | −2.0208E−04 | −1.7008E−04 | 3.9384E−05 | −2.4876E−06 |
| S5 | −3.9525E−03 | 8.0864E−04 | −1.1713E−04 | 9.5686E−06 |
| S6 | −1.1654E−02 | 3.8741E−03 | −6.6615E−04 | 4.1763E−05 |
| S7 | 1.8845E−02 | −9.2449E−03 | 2.4915E−03 | −2.8336E−04 |
| S8 | 1.2047E−02 | −5.2095E−03 | 1.2795E−03 | −1.3638E−04 |
| S9 | 2.8469E−02 | −1.1142E−02 | 2.4414E−03 | −2.2622E−04 |
| S10 | 2.7548E−03 | −7.4945E−04 | 1.1622E−04 | −7.6605E−06 |
| S11 | 3.2746E−04 | −5.1802E−05 | 4.4094E−06 | −1.5480E−07 |
| S12 | −1.5774E−05 | −9.9092E−07 | 1.9575E−07 | −7.8644E−09 |
| S13 | −2.0422E−05 | 1.9301E−06 | −1.0318E−07 | 2.2761E−09 |
| S14 | 1.2158E−05 | −8.7886E−07 | 3.4287E−08 | −5.5734E−10 |
| S15 | −7.1639E−07 | 2.2202E−08 | −3.8970E−10 | 2.9753E−12 |
| S16 | 3.6871E−08 | −9.8455E−11 | −1.5261E−11 | 2.2811E−13 |

Figures 14A, 14B:
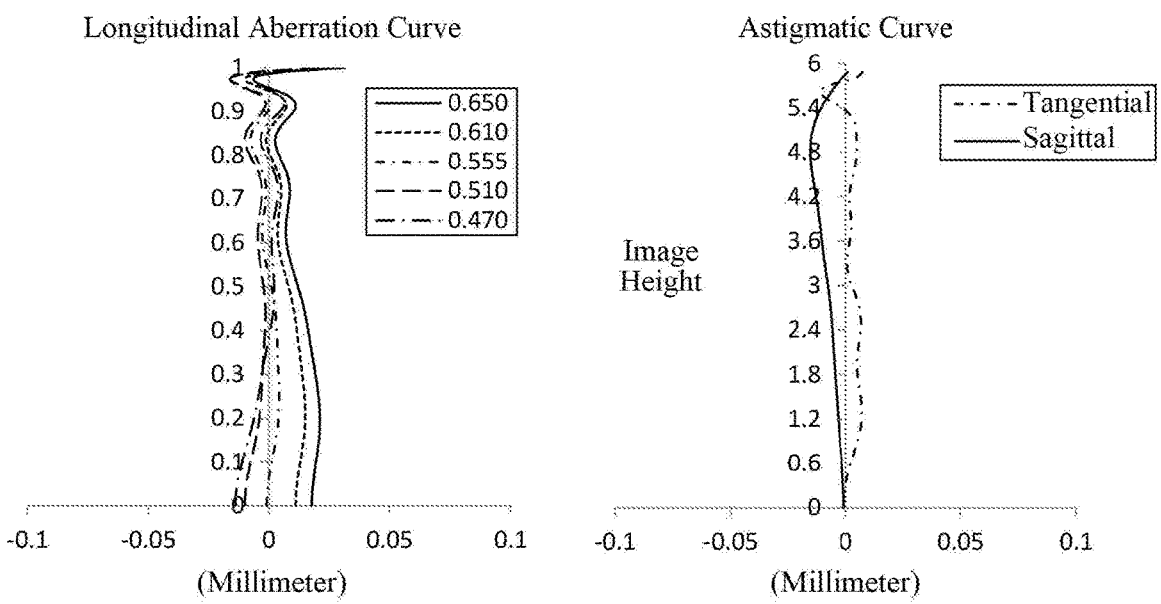

FIG. 14A illustrates a longitudinal aberration curve of the optical imaging lens assembly according to Example 7, representing deviations of focal points converged by light of different wavelengths after passing through the lens assembly. FIG. 14B illustrates an astigmatic curve of the optical imaging lens assembly according to Example 7, representing a curvature of a tangential plane and a curvature of a sagittal plane. FIG. 14C illustrates a distortion curve of the optical imaging lens assembly according to Example 7, representing amounts of distortion corresponding to different image heights. FIG. 14D illustrates a lateral color curve of the optical imaging lens assembly according to Example 7, representing deviations of different image heights on an imaging plane after light passes through the lens assembly. It can be seen from FIG. 14A to FIG. 14D that the optical imaging lens assembly provided in Example 7 may achieve good image quality.

In view of the above, Examples 1 to 7 respectively satisfy the relationship shown in Table 17.

TABLE 17

| | Example | | | | | | |
|---|---|---|---|---|---|---|---|
| Conditional | 1 | 2 | 3 | 4 | 5 | 6 | 7 |
| TTL/ImgH | 1.32 | 1.29 | 1.34 | 1.30 | 1.33 | 1.31 | 1.31 |
| f/EPD | 1.70 | 1.90 | 1.72 | 1.72 | 1.72 | 1.74 | 1.80 |
| f × tan(Semi-FOV) (mm) | 5.79 | 5.84 | 5.71 | 5.98 | 5.77 | 5.92 | 5.92 |
| f67/f12345 | 0.80 | 0.89 | 0.92 | 0.86 | 0.78 | 0.97 | 0.96 |
| ET7/CT7 | 0.58 | 0.80 | 0.76 | 0.99 | 0.63 | 0.69 | 0.97 |
| SAG51/SAG52 | 0.54 | 0.50 | 0.42 | 0.40 | 0.54 | 0.45 | 0.48 |
| SAG61/SAG62 | 0.85 | 0.84 | 0.81 | 0.76 | 0.81 | 0.93 | 0.82 |
| SAG71/SAG81 | 0.67 | 0.73 | 0.58 | 0.72 | 0.58 | 0.77 | 0.70 |
| f/f1 | 0.91 | 0.83 | 0.87 | 0.85 | 0.84 | 1.20 | 1.10 |
| f8/f3 | 0.37 | 0.35 | 0.28 | 0.28 | 0.34 | 0.37 | 0.41 |
| (R2 − R1)/(R2 + R1) | 0.46 | 0.40 | 0.43 | 0.42 | 0.40 | 0.75 | 0.66 |
| R6/R5 | 0.36 | 0.36 | 0.43 | 0.42 | 0.36 | 0.37 | 0.24 |
| R7/R8 | 0.74 | 0.86 | 1.20 | 1.25 | 0.76 | 0.77 | 0.77 |
| R12/R11 | 0.93 | 1.04 | 0.90 | 1.05 | 1.03 | 0.89 | 0.92 |
| f7/(R13 − R14) | 0.44 | 0.42 | 0.44 | 0.42 | 0.43 | 0.40 | 0.44 |
| R16/R15 | −0.76 | −0.75 | −0.77 | −0.76 | −0.76 | −0.61 | −0.94 |
| CT5/CT1 | 0.74 | 0.82 | 0.77 | 0.79 | 0.75 | 0.70 | 0.73 |
| T56/(T45 + T67) | 0.43 | 0.51 | 0.81 | 0.64 | 0.42 | 0.62 | 0.63 |

TABLE 17-continued

| Conditional | Example | | | | | | |
|---|---|---|---|---|---|---|---|
| | 1 | 2 | 3 | 4 | 5 | 6 | 7 |
| (CT2 + CT3 + CT4 + CT6)/ΣAT | 0.54 | 0.43 | 0.47 | 0.46 | 0.52 | 0.52 | 0.44 |
| CT8/T78 | 0.60 | 0.58 | 0.63 | 0.64 | 0.63 | 0.80 | 0.56 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having refractive power;
   a second lens having refractive power;
   a third lens having negative refractive power;
   a fourth lens having refractive power and a convex object-side surface;
   a fifth lens having refractive power and a concave object-side surface;
   a sixth lens having refractive power;
   a seventh lens having refractive power; and
   an eighth lens having refractive power,
   wherein f*tan(Semi-FOV)>5.5 mm, and 0.5<f/f1<1.5,
   where f is a total effective focal length of the optical imaging lens assembly, Semi-FOV is half of a maximal field-of-view of the optical imaging lens assembly, and f1 is an effective focal length of the first lens.

2. The optical imaging lens assembly according to claim 1, wherein TTL/ImgH<1.4, where TTL is a distance along the optical axis from an object-side surface of the first lens to an imaging plane of the optical imaging lens assembly, and ImgH is half of a diagonal length of an effective pixel area on the imaging plane of the optical imaging lens assembly.

3. The optical imaging lens assembly according to claim 1, wherein f/EPD<2, where f is the total effective focal length of the optical imaging lens assembly, and EPD is an entrance pupil diameter of the optical imaging lens assembly.

4. The optical imaging lens assembly according to claim 1, wherein 0.5<f67/f12345<1.0, where f67 is a combined focal length of the sixth lens and the seventh lens, and f12345 is a combined focal length of the first lens, the second lens, the third lens, the fourth lens and the fifth lens.

5. The optical imaging lens assembly according to claim 1, wherein 0.5<ET7/CT7<1.0, where ET7 is an edge thickness of the seventh lens, and CT7 is a center thickness of the seventh lens along the optical axis.

6. The optical imaging lens assembly according to claim 1, wherein 0.3<SAG51/SAG52<0.8, where SAG51 is a distance along the optical axis from an intersection of the object-side surface of the fifth lens and the optical axis to a vertex of a effective radius of the object-side surface of the fifth lens, and SAG52 is a distance along the optical axis from an intersection of an image-side surface of the fifth lens and the optical axis to a vertex of a effective radius of the image-side surface of the fifth lens.

7. The optical imaging lens assembly according to claim 1, wherein 0.5<SAG61/SAG62<1.0,
where SAG61 is a distance along the optical axis from an intersection of an object-side surface of the sixth lens and the optical axis to a vertex of a effective radius of the object-side surface of the sixth lens, and SAG62 is a distance along the optical axis from an intersection of an image-side surface of the sixth lens and the optical axis to a vertex of a effective radius of the image-side surface of the sixth lens.

8. The optical imaging lens assembly according to claim 1, wherein 0.5<SAG71/SAG81<1.0,
where SAG71 is a distance along the optical axis from an intersection of an object-side surface of the seventh lens and the optical axis to a vertex of a effective radius of the object-side surface of the seventh lens, and SAG81 is a distance along the optical axis from an intersection of an object-side surface of the eighth lens and the optical axis to a vertex of a effective radius of the object-side surface of the eighth lens.

9. The optical imaging lens assembly according to claim 1, wherein 0.2<f8/f3<0.7, where f8 is an effective focal length of the eighth lens, and f3 is an effective focal length of the third lens.

10. The optical imaging lens assembly according to claim 1, wherein 0.2<(R2−R1)/(R2+R1)<1.0, where R2 is a radius of curvature of an image-side surface of the first lens, and R1 is a radius of curvature of an object-side surface of the first lens.

11. The optical imaging lens assembly according to claim 1, wherein 0.2<R6/R5<0.7, where R6 is a radius of curvature of an image-side surface of the third lens, and R5 is a radius of curvature of an object-side surface of the third lens.

12. The optical imaging lens assembly according to claim 1, wherein 0.5<R7/R8<1.5, where R8 is a radius of curvature of an image-side surface of the fourth lens, and R7 is a radius of curvature of the object-side surface of the fourth lens.

13. The optical imaging lens assembly according to claim 1, wherein 0.7<R12/R11<1.2, where R12 is a radius of curvature of an image-side surface of the sixth lens, and R11 is a radius of curvature of an object-side surface of the sixth lens.

14. The optical imaging lens assembly according to claim 1, wherein 0.2<f7/(R13−R14)<0.7,
where f7 is an effective focal length of the seventh lens, R13 is a radius of curvature of an object-side surface of the seventh lens, and R14 is a radius of curvature of an image-side surface of the seventh lens.

15. The optical imaging lens assembly according to claim 1, wherein −1.5<R16/R15<−0.5, where R16 is a radius of curvature of an image-side surface of the eighth lens, and R15 is a radius of curvature of an object-side surface of the eighth lens.

16. The optical imaging lens assembly according to claim 1, wherein $0.7<CT5/CT1<1.2$, where CT5 is a center thickness of the fifth lens along the optical axis, and CT1 is a center thickness of the first lens along the optical axis.

17. The optical imaging lens assembly according to claim 1, wherein $0.4<T56/(T45+T67)<0.9$,
where T45 is a spaced interval between the fourth lens and the fifth lens along the optical axis, T56 is a spaced interval between the fifth lens and the sixth lens along the optical axis, and T67 is a spaced interval between the sixth lens and the seventh lens along the optical axis.

18. The optical imaging lens assembly according to claim 1, wherein $0.3<(CT2+CT3+CT4+CT6)/\Sigma AT<0.8$,
where CT2 is a center thickness of the second lens along the optical axis, CT3 is a center thickness of the third lens along the optical axis, CT4 is a center thickness of the fourth lens along the optical axis, CT6 is a center thickness of the sixth lens along the optical axis, and $\Sigma AT$ is a sum of spaced intervals along the optical axis between each two adjacent lenses of the first to the eighth lenses.

19. The optical imaging lens assembly according to claim 1, wherein $0.5<CT8/T78<1.0$, where CT8 is a center thickness of the eighth lens along the optical axis, and T78 is a spaced interval between the seventh lens and the eighth lens along the optical axis.

20. The optical imaging lens assembly according to claim 1, wherein the first lens has positive refractive power, an object-side surface of the first lens is convex, and an image-side surface of the first lens is concave;
an object-side surface of the sixth lens is convex, and an image-side surface of the sixth lens is concave; and
an object-side surface of the seventh lens is convex, and an image-side surface of the seventh lens is convex.

* * * * *